(12) United States Patent  
Unrein

(10) Patent No.: US 6,437,979 B1  
(45) Date of Patent: Aug. 20, 2002

(54) PROCESSOR ARRANGEMENT AND THERMAL INTERFACE

(75) Inventor: Edgar J. Unrein, Stellacoom, WA (US)

(73) Assignee: Intel Corporation, Santa Clara, CA (US)

( * ) Notice: Subject to any disclaimer, the term of this patent is extended or adjusted under 35 U.S.C. 154(b) by 92 days.

(21) Appl. No.: 09/607,183

(22) Filed: Jun. 29, 2000

(51) Int. Cl.⁷ ................................................ H05K 7/20
(52) U.S. Cl. .................. 361/687; 361/692; 361/704; 257/719; 165/185
(58) Field of Search .................. 361/687, 690–695, 361/704–715, 719–722, 724, 683, 725, 749, 752; 257/706–727; 165/80.2, 80.3, 185, 80.4, 165, 104.33, 104.32, 106.36; 174/16.3, 35 R; 62/3.2, 3.7, 3.5, 3.6, 3.62, 259.2, 223

(56) References Cited

U.S. PATENT DOCUMENTS

| | | | | |
|---|---|---|---|---|
| 5,424,913 A | * | 6/1995 | Swindler | 361/687 |
| 5,704,212 A | * | 1/1998 | Erler et al. | 62/3.2 |
| 5,754,400 A | * | 5/1998 | Sathe et al. | 361/704 |
| 5,812,375 A | * | 9/1998 | Casperson | 361/707 |
| 5,883,782 A | * | 3/1999 | Thurston et al. | 361/704 |
| 5,896,269 A | * | 4/1999 | Autry | 361/704 |
| 5,901,039 A | * | 5/1999 | Dehaine et al. | 361/704 |
| 5,933,327 A | * | 8/1999 | Leighton et al. | 361/710 |
| 5,969,940 A | * | 10/1999 | Sano et al. | 361/687 |
| 5,978,223 A | * | 11/1999 | Hamilton et al. | 361/704 |
| 5,982,622 A | * | 11/1999 | Chiou | 361/704 |
| 6,043,984 A | * | 3/2000 | Tseng | 361/704 |
| 6,191,943 B1 | * | 2/2001 | Tracy | 361/687 |
| 6,219,244 B1 | * | 4/2001 | Chen | 361/704 |
| 6,285,550 B1 | * | 9/2001 | Belady | 361/704 |
| 6,301,115 B1 | * | 10/2001 | Hashimoto et al. | 361/704 |

FOREIGN PATENT DOCUMENTS

| | | | | | |
|---|---|---|---|---|---|
| JP | 406163758 A | * | 6/1994 | | H01L/23/32 |
| JP | 409082859 A | * | 3/1997 | | H01L/23/40 |

* cited by examiner

Primary Examiner—Darren Schuberg  
Assistant Examiner—Michael Datskovsky  
(74) Attorney, Agent, or Firm—Marger Johnson & McCollom, P.C.

(57) ABSTRACT

A computer platform according to this invention includes a housing. A CPU board is located within the housing and a power pod assembly is located adjacent a first side of the CPU board. A CPU socket is located on a second side of the CPU board, opposite the first side of the CPU board. A processor is mounted within the CPU socket and arranged in electrical communication with the power pod. A cooling device located adjacent the processor on the second side of the CPU board, and is configured to cool the processor. A processor arrangement for a computer platform is also provided which includes a CPU board having a processor mounted on the CPU board. A biasing mechanism supplies a biasing force against the processor to maintain it in thermal communication with a cooling device.

20 Claims, 20 Drawing Sheets

75 SQUARE INCHES (TOP VIEW)

122 CUBIC INCHES W/O DUCTING

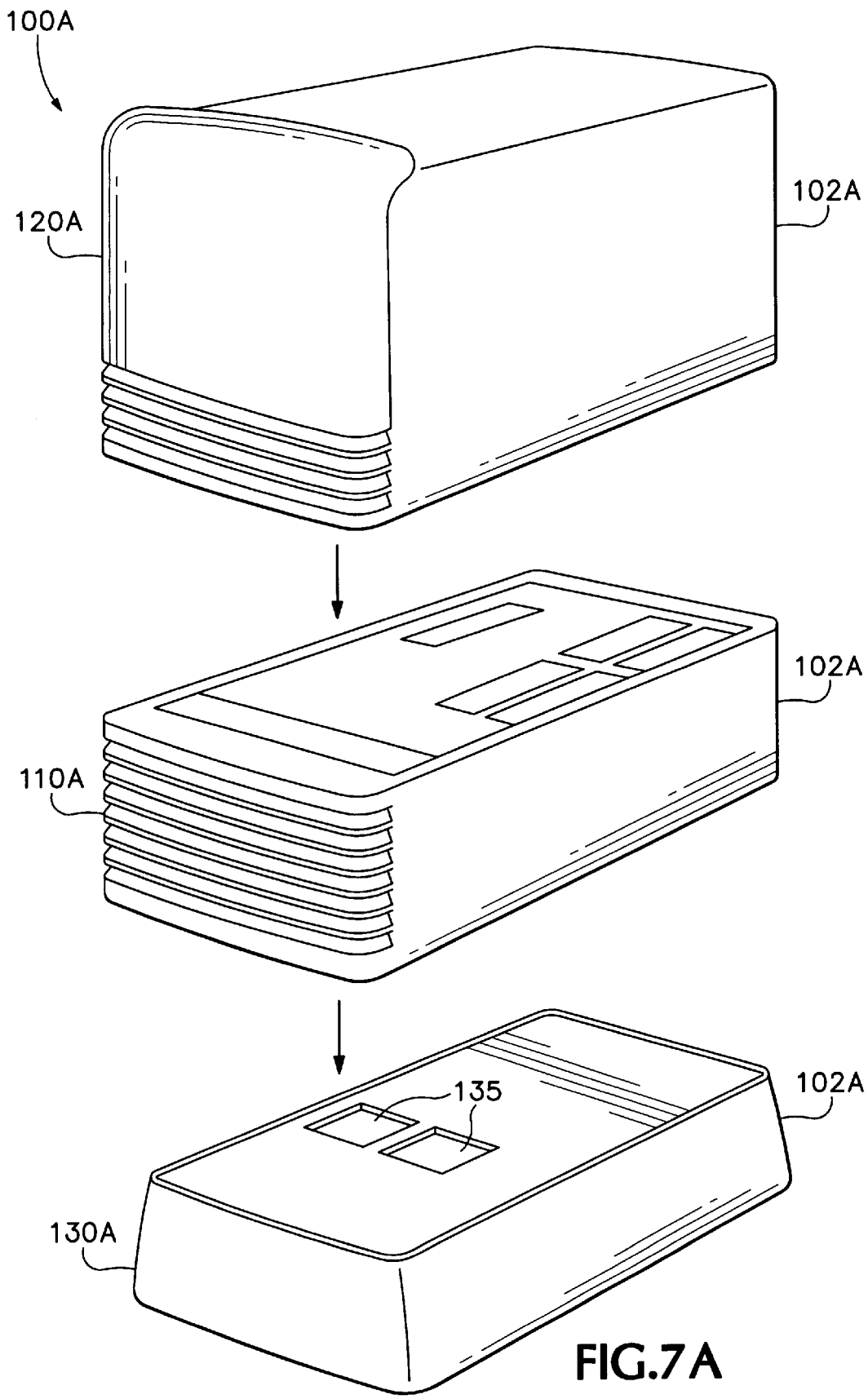

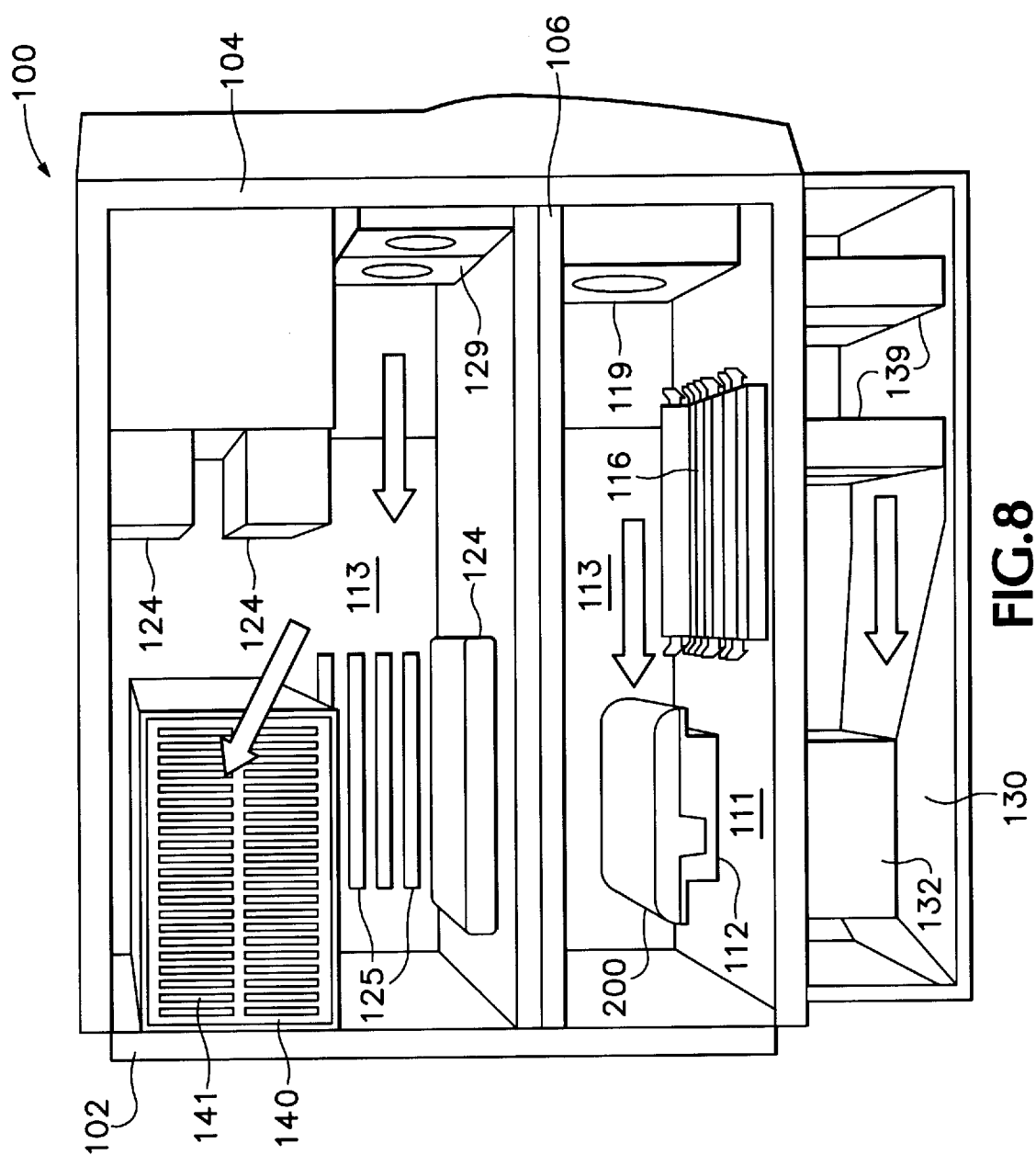

PROCESSOR ARRANGEMENT AND THERMAL INTERFACE

BACKGROUND OF THE INVENTION

This invention relates generally to personal computers, workstations, and servers. More specifically, this invention relates to thermal and acoustic control of personal computer platforms, workstation platforms, and server platforms ("platforms" or "systems"). This invention further relates to a processor arrangement and processor thermal interface within a computer platform.

A major concern with personal computer, workstation, and server platforms is proper control of the thermal characteristics inside the platform's housing. Today's computer platforms generally have only a single, unitary housing, such as a desktop casing, mini-tower casing, or tower casing, into which all of the computer's electronic components are placed. Inside these casings, most, if not all, of the electronic components are located within a single thermal environment.

Almost all electronic components generate heat when operated. And, different components produce different amounts of heat. The amount of heat an electronic component generates typically depends on its power consumption, and, therefore, even a single component produces different amounts of heat at different times, depending on the amount of work it is doing. Microprocessors (also called "processors" or "CPUs"), in particular, generate varying amounts of heat during operation, depending on the amount of information they are required to process.

If an electronic component overheats, malfunction or premature failure of the component is likely to result. Cooling the electronic components is therefore necessary. At the same time, however, overcooling may result in condensation of water vapor within the computer housing. Liquid and refrigeration cooling methods, in particular, are prone to creating condensation problems inside conventional computer platform housings. In addition, because different electronic components generate different amounts of heat, different areas within the computer housing have different cooling requirements. The cooling requirements of components are often in contention with one another, including those of components in close proximity properly controlling the thermal characteristics of conventional platforms is difficult.

The conventional approach to thermal control of computer platforms has included mainly point solutions. Point solutions focus on the components that produce the greatest amount of heat, such as the processor, or on specific areas within the computer housing that have the greatest need for temperature control. Unfortunately, because temperature exchange within conventional computer housings is generally uncontrolled, this point approach can result in some components being cooled insufficiently while other components become overcooled. The point solution approach consequently results in thermal chaos within the computer housing.

Another problem in the industry is that modern computer systems are not easy to adapt or to upgrade. Replacing worn or antiquated components can be difficult. Because of the rapid advance in microprocessor and other computing technologies, many consumers desire the ability to upgrade their computer systems by replacing individual components of the system, rather than replacing the system entirely.

Upgrading a conventional computer system generally requires opening the casing, identifying the parts for replacement, disconnecting them, removing them, and putting in the new components. This can require the user to disconnect and reconnect power supply or other cabling, among other things. Upgrading a computer platform often requires a higher degree of computer expertise than many consumers have. Furthermore, upgraded components often have higher cooling requirements than the components they replace. This is typically the case with microprocessors, because, as processing speeds increase, the heat output and cooling requirements of the processors increase correspondingly. Cooling systems, therefore, may need to be upgraded when other components are upgraded.

Yet another significant problem in the industry is meeting the acoustic goals, or "quiet office" requirements, of the computer platform. Consumers desire computer platforms that do not generate excessive noise during operation. A conventional "quiet office" requirement for a computer platform, for instance, requires that noise from the computer system be less than approximately 5.2 bels. The industry has had difficulty producing systems that meet both the cooling needs of the platform and these "quiet office" requirements. This is because the primary noise generating components in a computer platform are the cooling systems, including the CPU fan(s) and the system fan(s), in particular. Other major contributors to the noise of a system include the power supply and the drives.

Unfortunately, most conventional systems are generally inefficient in delivering cooling air from the fans to the components to be cooled. Furthermore, conventional cooling techniques cool based on a volume of air (or "throughput," measured in terms of cubic feet per minute (CFM)) supplied across the components. To increase the cooling performance of the system, therefore, the air throughput must be increased. This can be done, for example, by increasing the operating speed of the fans or the size of the fans. Either of these two approaches generally results in noisier cooling systems and, hence, noisier platform operation.

Ducting has been attempted as a way of more efficiently directing air from the cooling fans to the components to be cooled. Ducting alone, however, has not proven efficient in meeting the cooling requirements of a system. Ducting's inefficiency is due in part to significant air leakage (i.e., around 35%) from the ducting because of the difficulty in fitting the duct around computer components. As noted above, inefficient cooling makes it difficult for the platform to meet both cooling and acoustic goals.

Yet another problem in prior art computer platforms is the complexity of the processor arrangement and its cooling interface. Conventional processor arrangements, particularly for multiple processor systems, are bulky and structurally complex. Specifically, prior art processor arrangements typically use a board-mounted retention scheme to support the processors, the processor heatsinks, the power pods, and the power pod heatsinks. Unfortunately, the prior art arrangement occupies more board area than desirable and is also volumetrically inefficient.

Additionally, board-mounting raises additional concerns relating to the strength of the board, the location of board supports, and shock and vibration concerns, for example. In particular, shock and/or vibration of the computer platform can seriously jeopardize the structural integrity of a CPU board that uses a board-mounted retention scheme. This is because shock and/or vibration causes the heatsinks for both the processors and the power pods to move. Because the heatsinks are heavy, their movement causes stress in the CPU board. CPU board stress can seriously damage the CPU board and/or board-mounted components. For these reasons, the allowable size and mass of the power pod and CPU heatsinks are limited in such an arrangement. Board mounting can also create tolerance stack-up problems because the board-mounted components are typically located directly on top of each other on the CPU board, causing their tolerances to add up.

BRIEF DESCRIPTION OF THE DRAWINGS

FIG. 7A is a somewhat schematic exploded perspective view of the partitioned computer platform of FIG. 6, showing a core module, a non-core module, and a remote cooling module.

FIG. 8 is a somewhat schematic cut-away side perspective view of the partitioned computer platform of FIG. 5, showing some internal components of the platform and illustrating a plurality of isolated wind-tunnels created by the partitions.

DETAILED DESCRIPTION

Figure 1:
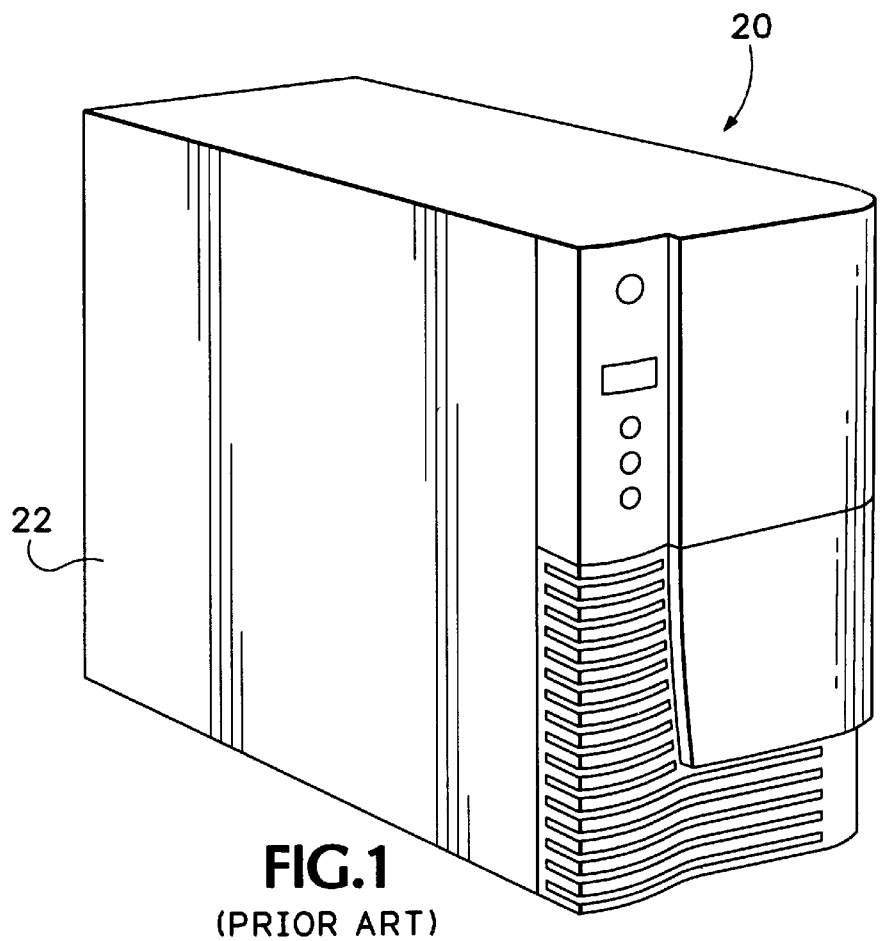
FIG. 1 is a somewhat schematic external perspective view of a conventional computer platform according to the prior art.
Figure 2:
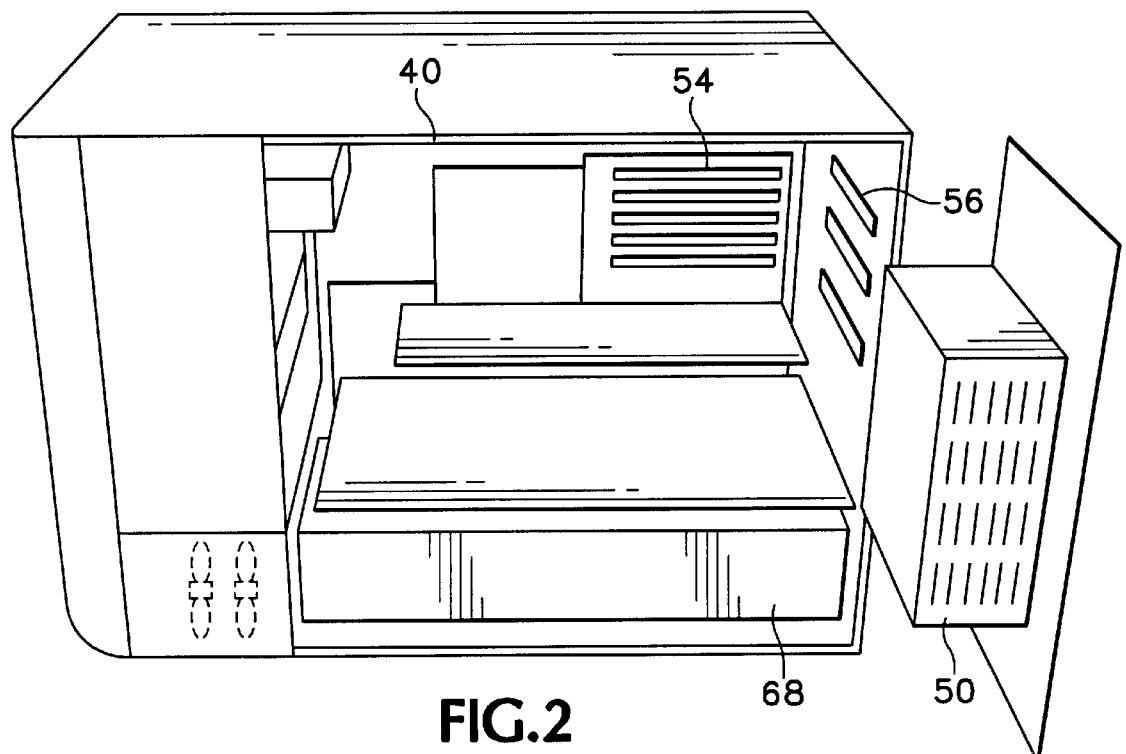
FIG. 2 is a somewhat schematic internal perspective view of the conventional computer platform of FIG. 1.
Figure 3:
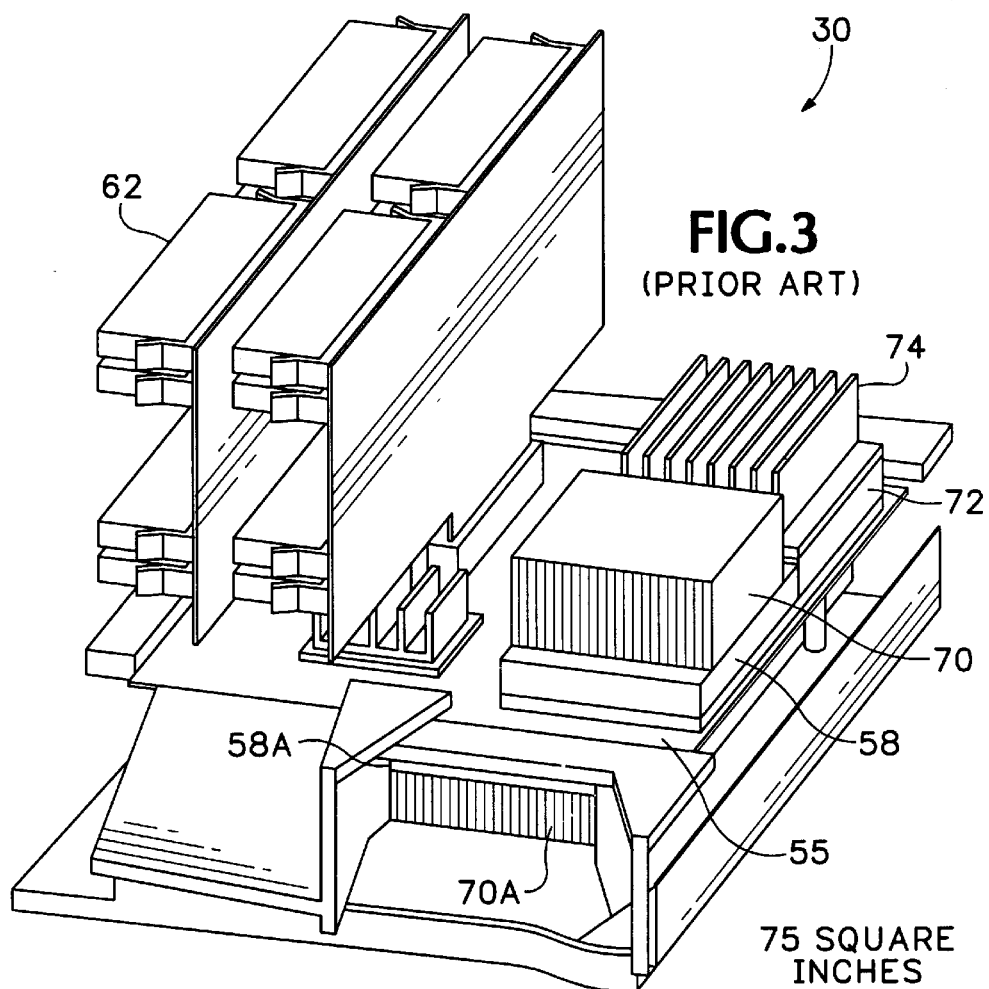
FIG. 3 is a somewhat schematic perspective view of a prior art processor arrangement, as used in the computer platform of FIG. 1.
Figure 4:
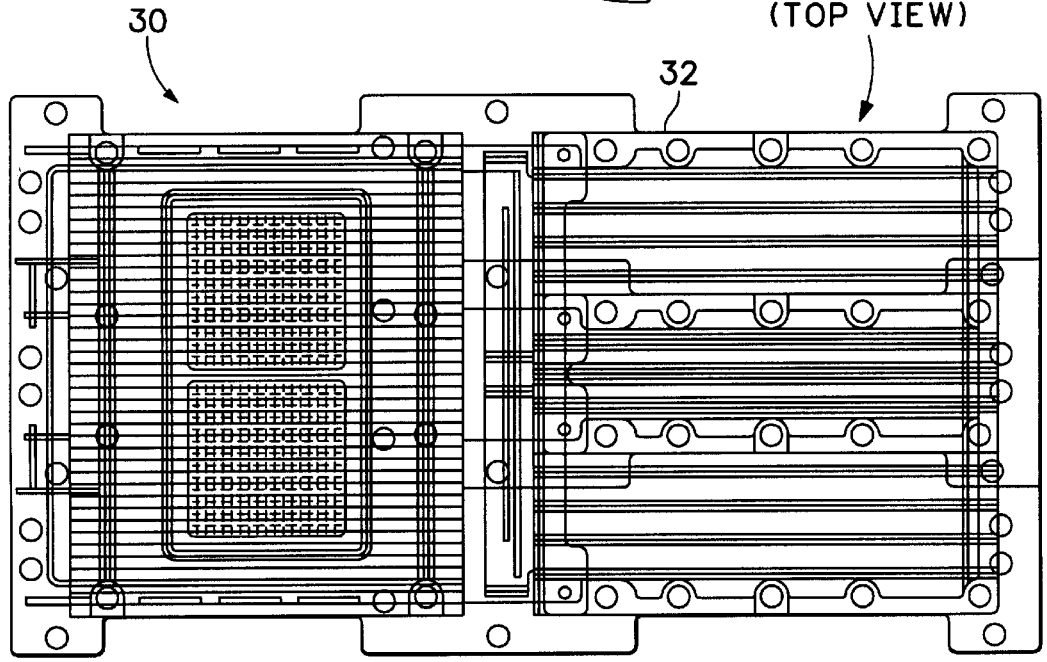
FIG. 4 is a somewhat schematic semi-transparent top plan view of the conventional processor arrangement of FIG. 3, showing a footprint of the prior art processor arrangement on a CPU board.
Figure 3A:
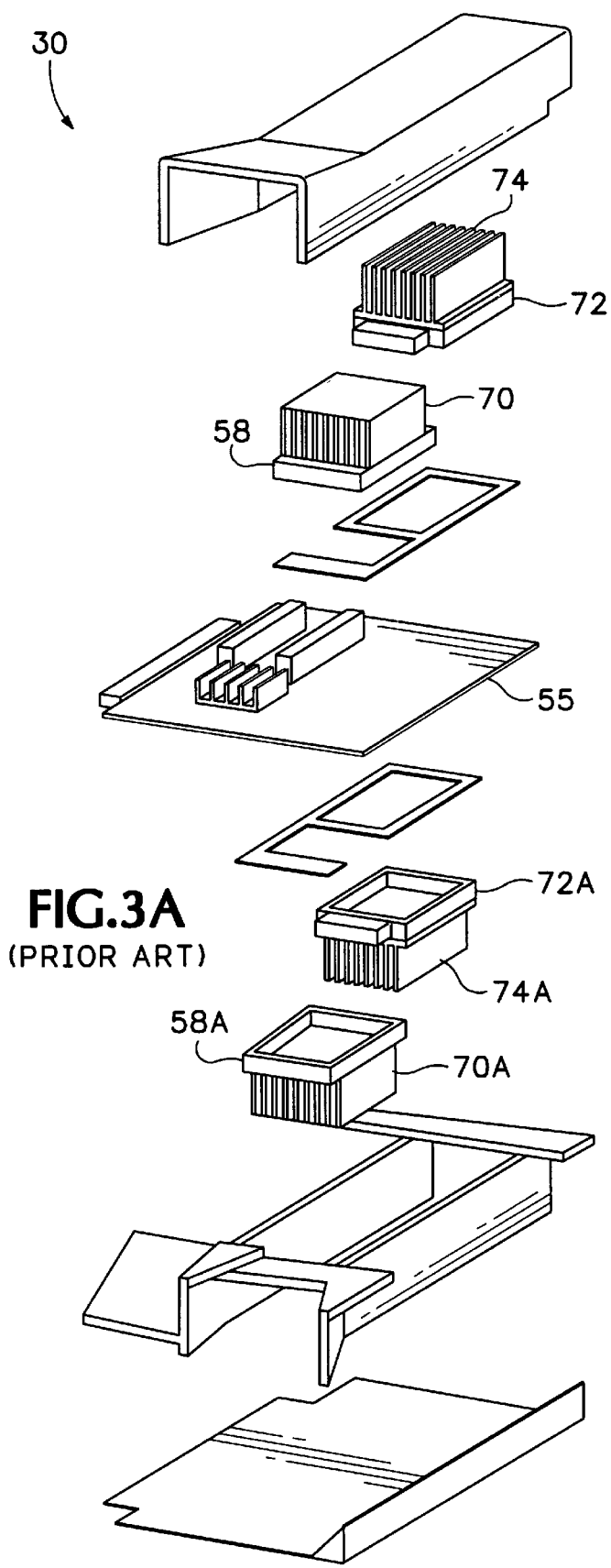
FIG. 3A is a somewhat schematic exploded perspective view of the prior art processor arrangement of FIG. 3.

One example of a conventional computer platform 20, having a tower casing 22, is illustrated in FIGS. 1–4. FIG. 1 is a somewhat schematic external perspective view of the conventional computer platform 20. FIG. 2 is a somewhat schematic perspective view of the conventional computer platform 20 of FIG. 1, showing the platform 20 having an outer wall of its casing 22 removed to permit viewing of its internal components. FIG. 3 is a somewhat schematic perspective view, and FIG. 3A is a somewhat schematic exploded perspective view, of a processor arrangement 30 of the prior art platform 20 of FIG. 1. Finally, FIG. 4 is a somewhat schematic semi-transparent top plan view of the processor arrangement 30 of FIG. 3, showing a footprint of the processors 58, 58A on the CPU board 55.

Referring to FIGS. 1 and 2, a conventional computer platform 20 may include a tower-type casing 22, or mini-tower or desk-top casing, for housing its electronic components. The electronic components of a computer platform 20 typically include a power supply 50, drives 52, PCI card slots 54, and I/O ports 56. A platform 20 also typically includes one or more processor(s), a chip set, memory modules, a voltage regulator, a graphics controller, and more. Each of these electronic components operates within the computer platform 20 in combination with the other electronic components to provide one of more of the platform's functions or capabilities. These components will generate varying amounts of heat when operated. Unfortunately, as shown by FIG. 2, this computer platform 20 houses the bulk of its electronic components within a single thermal environment (represented by dashed line 40).

In this particular prior art platform, internal ducting 68 is provided around the processors to direct air from cooling fans over the processors and through their heatsinks. The power supply 50 is also located in a separate housing 51 within the computer casing 22. There is, however, not any further thermal segregation of the electronic components.

FIGS. 3, 3A, and 4 show a processor arrangement 30 having dual processors according to the prior art. Referring specifically to FIGS. 3 and 3A, the dual processor arrangement 30 of the prior art includes a CPU board 55 on which two processors 58, 58A, their corresponding processor heatsinks 70, 70A, power pods 72, 72A, and power pod heatsinks 74, 74A are all mounted. A first processor assembly, including a first processor 58 and its corresponding heatsink 70, power pod 72, and power pod heatsink 74, is located on a first side of the CPU board. A second processor assembly, including a second processor 58A, its heatsink 70A, power pod 72A, and power pod heatsink 74A, is located on a second, opposite side of the CPU board 55 to conserve board space. Ducting 68, 68A is provided around each of the processor assemblies to direct a cooling airflow through fins of the heatsinks 70, 70A, 74, 74A. In this particular prior art configuration, the ducting includes an outer duct 68 surrounding the first processor assembly and an inner duct 68A surrounding the second processor assembly.

Unfortunately, board mounting these electronic components, particularly the heatsinks 70, 70A, 74, 74A, has several disadvantages. As noted previously, board mounting causes tolerances of the components to add together because of their stacking arrangement on the CPU board 55. Even more significantly, however, board mounting the heavy heatsinks creates stress in the CPU board 55. Vibration of, or shock to, the computer platform can cause significant damage to the CPU board 55 or the board-mounted components. For these reasons, size and mass limitations must be placed on the processor and power pod heatsinks 70, 70A, 74, 74A, to reduce the risk of board or component failure. These size and mass limitations also place a cap on the cooling ability of the processor arrangement 30.

Figure 4A:
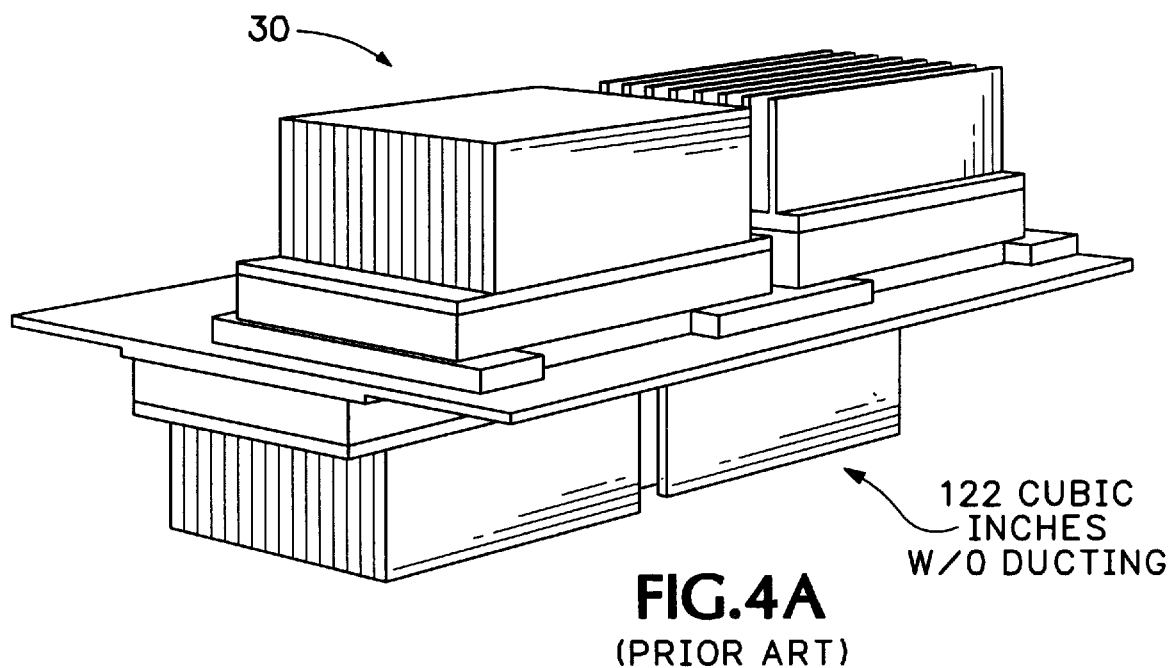
FIG. 4A is a somewhat schematic perspective view of the prior art processor arrangement.

FIG. 4 is a somewhat schematic semi-transparent top view of the processor arrangement 30 of FIG. 3, showing a footprint 32 of the processors, heatsinks and power pods on the CPU board. FIG. 4A is a somewhat schematic perspective view of the processor arrangement 30. Referring to FIGS. 4 and 4A, the footprint 32 of the prior art processor arrangement 30 is approximately 75 square inches, and the volume, without ducting, within the platform housing 22, that is occupied by this prior art processor arrangement 30 is about 122 cubic inches. Because of the industry's desire for smaller computer platforms, minimizing the footprint 32 and volume of the processor arrangement 30 is important.

Figure 5:
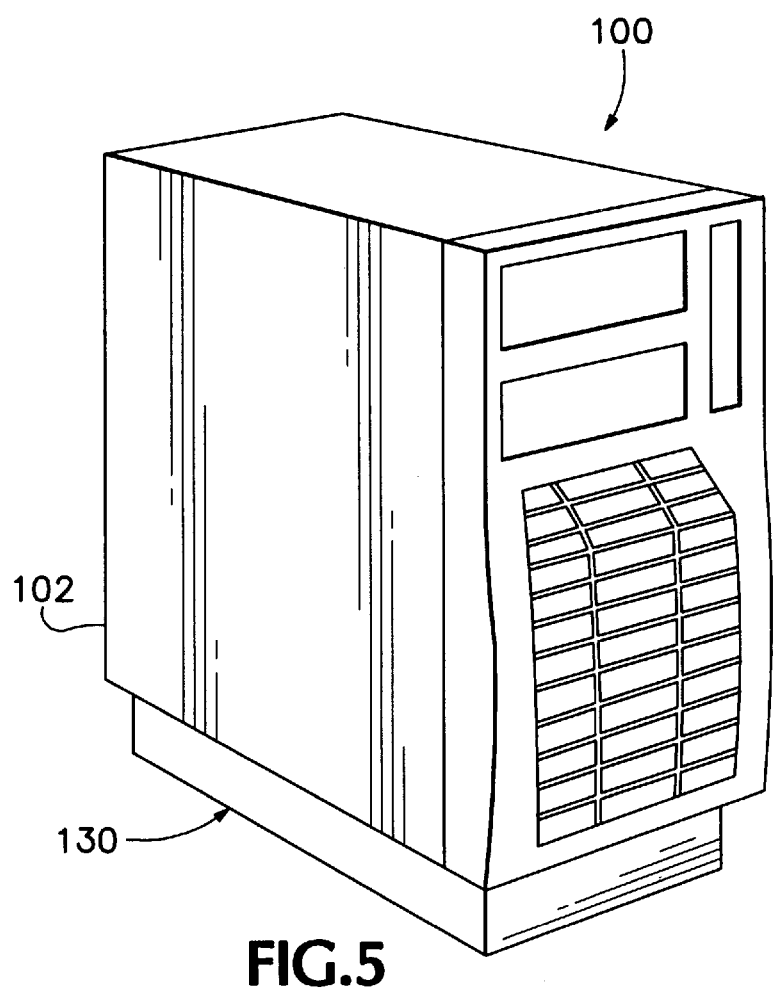
FIG. 5 is a somewhat schematic perspective view of a partitioned computer platform according to a first embodiment of the present invention.
Figure 6:
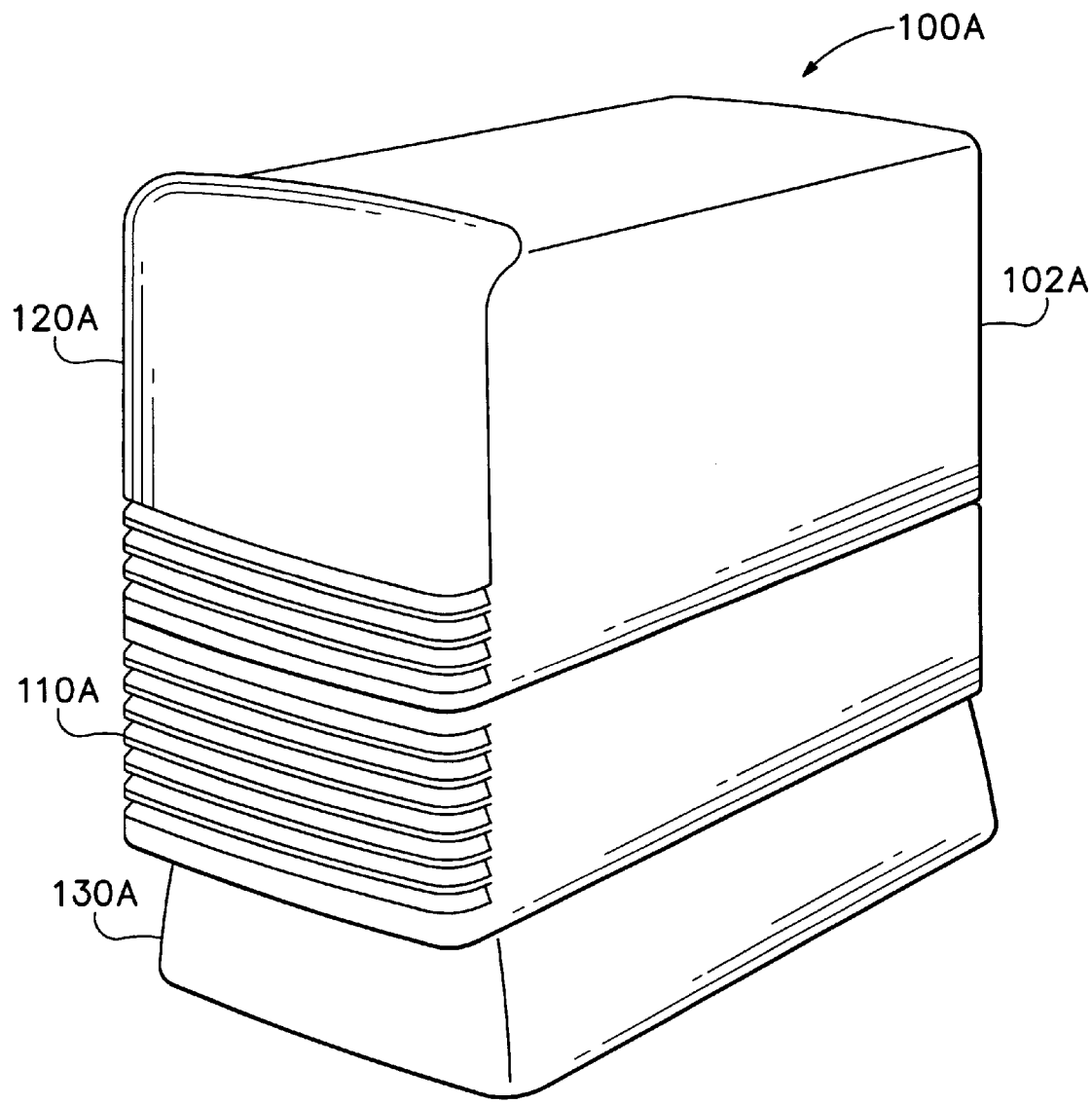
FIG. 6 is a somewhat schematic perspective view of a partitioned computer platform according to a second embodiment of the present invention.
Figure 7:
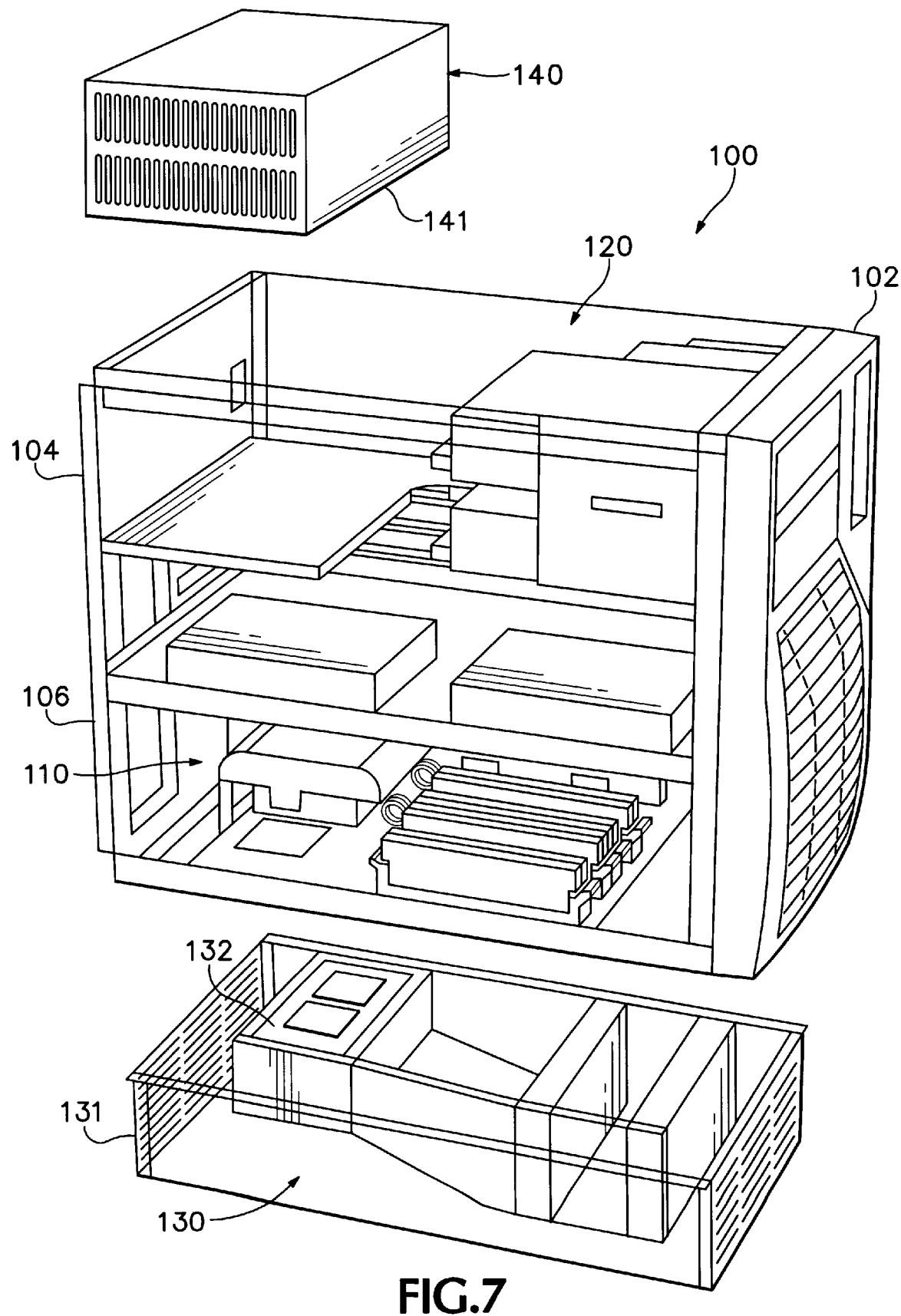
FIG. 7 is a somewhat schematic exploded perspective view of the partitioned computer platform of FIG. 5, showing a core partition, a non-core partition, a remote cooling partition, and a power supply partition.
Figure 8A:
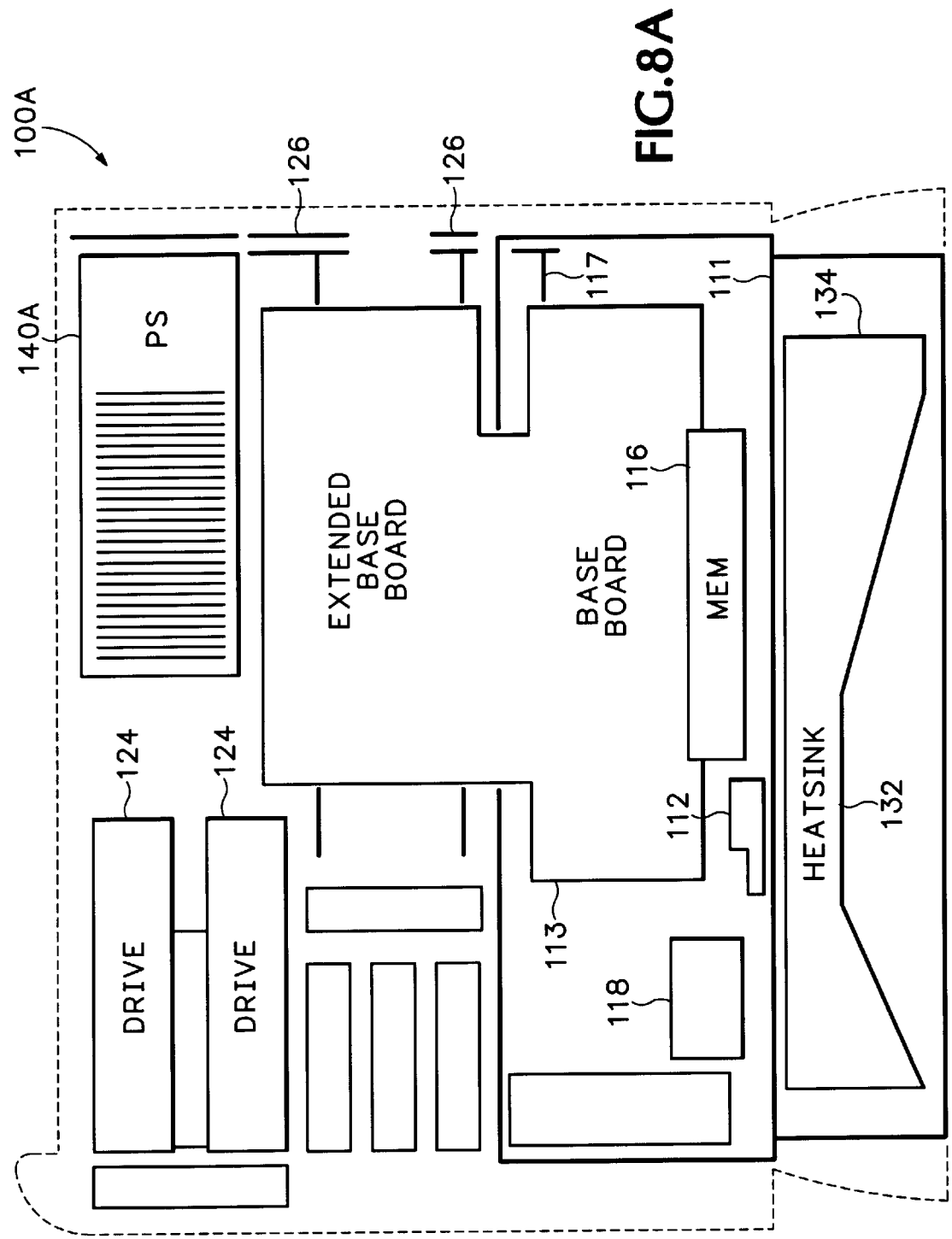
FIG. 8A is a somewhat schematic cut-away side view of the partitioned computer platform of FIG. 6, showing internal components of the platform.

The conventional workstation platform 20 described above will now be contrasted with two partitioned computer platform embodiments 100, 100A, shown in FIGS. 5 and 6, respectively, which have been designed according to the principles of this invention. FIGS. 5 and 6 are external perspective views of partitioned computer platforms 100, 100A, according to a first and second embodiment of this invention, respectively. FIGS. 7 and 7A are exploded perspective views of the partitioned computer platforms 100, 100A of FIGS. 5 and 6, respectively. FIGS. 8 and 8A are internal views of the partitioned computer platforms 100, 100A of FIGS. 5 and 6, respectively, showing a general arrangement of electronic components within the platform housing 102, 102A.

A first embodiment of the invention will now be discussed with reference to FIG. 5. Although, as shown in FIG. 5, a housing 102 of a partitioned computer platform 100 according to the first embodiment is somewhat similar externally to the computer casing 22 of the prior art platform 20, the arrangement of the platform housing 102 has several key differences. Initially, as can be seen from a comparison between FIGS. 1 and 5, the computer platform 100 according to the first embodiment of this invention is significantly smaller than the platform 20 of the prior art, but does not sacrifice power or performance. Furthermore, as can also be seen from FIG. 5, the partitioned computer platform 100 includes a removable partition 130 at the base of the housing 102. This removable partition, or remote cooling partition 130, provides a scalable cooling solution for the computer platform 100 of this embodiment.

In addition to these externally apparent differences, the computer platform 100 according to the first embodiment of this invention has an internal configuration that provides further significant advantages over the prior art platform 20. Comparing FIGS. 2 and 7, unlike the prior art platform 20, the computer platform 100 of this embodiment is internally divided into separate and distinct thermal environments or partitions. More specifically, the partitioned computer platform 100 of this embodiment includes a tower-type platform housing 102 internally divided into a core partition 110 and a non-core partition 120. In addition, the remote cooling partition 130 is removably attached to the bottom of the platform housing 102, directly below the core partition 110. A power supply partition 140 is also provided and is preferably located within the non-core partition 120.

In this embodiment, the housing 131 of the remote cooling partition 130 and the housing 141 of the power supply partition 140 are provided separate from the main body of the platform housing 102. The core partition 110 and the non-core partition 120, on the other hand, utilize the platform housing 102 and an internal divider 106 to define their boundaries. Regardless of how their boundaries are defined, because the partitions each provide an isolated thermal environment, such as a wind-tunnel or a cooling box, they can each be provided with an independent thermal solution designed specifically for that partition. Each of the partitions therefore provides similar benefits, resulting from having an isolated thermal environment, including improved cooling efficiency and quieter operation.

The specific configuration of these partitions will now be described in further detail. As noted above, the partitioned computer platform 100 contains three internal partitions—the core partition 110, the non-core partition 120, and the power supply partition 140. A fourth partition, the remote cooling partition 130, is provided externally. External walls of the housing 102 isolate the core 110 and non-core 120 partitions from the external environment. The core 110 and non-core partitions 120 are thermally isolated from each other by an internal wall or divider 106. The power supply partition 140 resides within the non-core partition 120 but has its own housing 141, which thermally isolates it from the non-core partition 120. The remote cooling partition 130 is preferably removably attachable to the housing 102. In this embodiment, the housing 131 of the remote cooling partition 130 is removably secured to the bottom of the platform housing 102, directly beneath the core partition 110. This arrangement enables the heatsink 132 of the remote cooling partition 130 to thermally communicate with one or more processors in the core partition 110. The thermal communication between the heatsink 132 and the processor(s) preferably takes place through a remote cooling interface located in the bottom of the platform housing 102.

Referring now to FIGS. 6 and 7A, a partitioned computer platform 100A according to a second embodiment of the invention is somewhat similar to the platform 100 of the first embodiment. The platform 100A of the second embodiment, for example, includes a housing 102A divided into several distinct partitions. These partitions preferably include a core partition 110A non-core partition 120A, and a remote cooling partition 130A. A power supply partition, preferably located within the non-core partition 120A, can also be included. Each partition 110A, 120A, 130A is preferably a specifically designed thermal environment, optimized for cooling electronic components located within, or arranged in communication with, that partition.

Unlike the platform 100 of the first embodiment, however, the partitions 110A, 120A, 130A of the computer platform 100A of the second embodiment are preferably interconnected having a readily severable and reattachable physical and electrical communication, in order to provide a modular-type platform arrangement. This modular platform arrangement allows complete partitions (or "modules") to be removed and replaced as desired to upgrade or repair the platform 100A. Additionally, because the core and non-core partitions 110A, 120A each includes its own, independent cooling solution, upgrading a partition automatically upgrades the cooling components in that partition. The remote cooling partition 130A can also be scaled to meet increased cooling requirements of upgraded processor(s).

In both of the previously described embodiments, operating requirements and electrical interconnections (including input and output signals and power connections, for example) for each of the partitions can be defined to facilitate separate, independent development of the partitions by various groups. Furthermore, in the modular-type arrangement, the location and configuration of the physical and electrical interconnections between the modules should also be specified to permit parallel, independent development. The external size and shape of the modular partitions can also be specified to provide a uniform external appearance.

Referring to FIGS. 8 and 8A, the internal components and configuration of the first and second embodiments of this invention will now be described. The core 110, 110A and non-core 120, 120A partitions contain the majority of the electronic components of the computer platforms 100, 100A. In both embodiments, the non-core partition 120, 120A contains the drive(s), PCI card(s), and a majority of the cabling. The power supply partition 140, 140A is also configured to sit inside the non-core partition 120, 120A. The core partition 110, 110A contains the processor(s), chip set(s), memory module(s), voltage regulator(s), and graphics card(s). The remote cooling partition 130, 130A contains a thermal solution for cooling the processor(s).

These computer platforms 100, 100A require contributions from each of the four partitions to function properly. In other words, the electronic and/or cooling components in each partition rely on the electronic and/or cooling components contained in one or more of the other partitions for their proper functioning. At the same time however, each partition provides an isolated thermal environment, such as a wind tunnel, for cooling the electronic components within that partition.

The core partition 110 is the central module of the computer platform 100 and contains the core data processing components. These data processing components preferably include one or more processors 112 on a CPU board 210. A baseboard 113, memory chips 116, a chip set, a graphics controller card, and a voltage regulator, can also be included in the core partition 110. The baseboard 113 also preferably extends into the non-core partition 120. A remote cooling interface can be provided at the base 111 of the core partition 110 to allow thermal communication between its processor(s) 112 and the remote cooling partition 130.

The non-core partition 120 primarily contains components that allow various types of external communication, such as, for example, communication with a user, with a power source, or with peripheral devices (i.e., a mouse, a printer, a keyboard, etc.). In particular, the non-core. partition 120 preferably contains the power supply partition 140, the drives 124, the peripheral Component Interconnect (PCI) slots 125, and Input/Output (I/O) ports. These components facilitate communication with external devices to both obtain electrical power for the platform, and to receive and transmit data. The non-core partition 120 also preferably contains a majority of the platform's cabling, thereby isolating the cabling from the components of the core partition 110. By isolating internal cabling, such as Integrated Device Electronics (IDE) cabling, Small Computer Systems Interface (SCSI) cabling, power cabling, etc., from high clock items like the processor(s) 112, chipsets, and memory 116, contained in the core partition 110, the partitioning of this invention can also reduce electromagnetic interference (EMI) within the platform 100, 100A.

Finally, the remote cooling partition 130, 130A is a specially housed cooling module for removing heat from the processor(s) 112 in the core partition 110, 110A. The remote cooling partition 130, 130A is completely scalable and can include a heat sink 132 and fan 139 cooling system, a liquid cooling and refrigeration cooling system, or any other type of cooling system sufficient to remove the required amount of heat from the microprocessor(s). In the first and second platform embodiments 100, 100A, the remote cooling partition 130 is located directly beneath the core partition 110. The processor(s) 112 in the core partition 110 are biased against a heat sink 132 of the remote cooling partition 130 by a loading or biasing force, provided, for example, by a load spring. The processors extend from the core partition 110 through the remote cooling interface formed in the bottom wall (or "base") 111 of the core partition 110.

Referring to FIGS. 7 and 8, the internal configuration of the first embodiment will now be described in further detail. As noted previously, the power supply partition 140 of this embodiment can be removably positioned within the non-core partition 120. The power supply partition 140 preferably includes a power supply and its own cooling fans. The power supply partition has a housing 141 configured to provide an isolated thermal environment that allows independent cooling of the power supply partition 140. The non-core partition 120 is formed within the housing 102 by the configuration of the housing walls and chassis (or "frame") 104. A thermal divider 106 separates the non-core partition 120 from the core partition 110 and thermally isolates them from each other. Thermal isolation provides each partition with an independent thermal environment and allows the partitions to each have its own independent thermal solution.

In this embodiment, the core partition 110, the non-core partition 120, and the remote cooling partition 130 each include an independent thermal environment configured as an isolated wind-tunnel. Each partition is cooled independently of the other partitions through one or more of its own cooling fans 119, 129, 139. The non-core partition 120 of this embodiment, for example, is cooled using a parallel fan assembly 129. The core partition 110 is cooled using a single cooling fan 119. The processor(s) 112 in the core partition 110, are cooled by heatsink 132 and fans 139 of the remote cooling partition 130 via the remote cooling interface located at the base 111 of the core partition 110.

Figure 9:
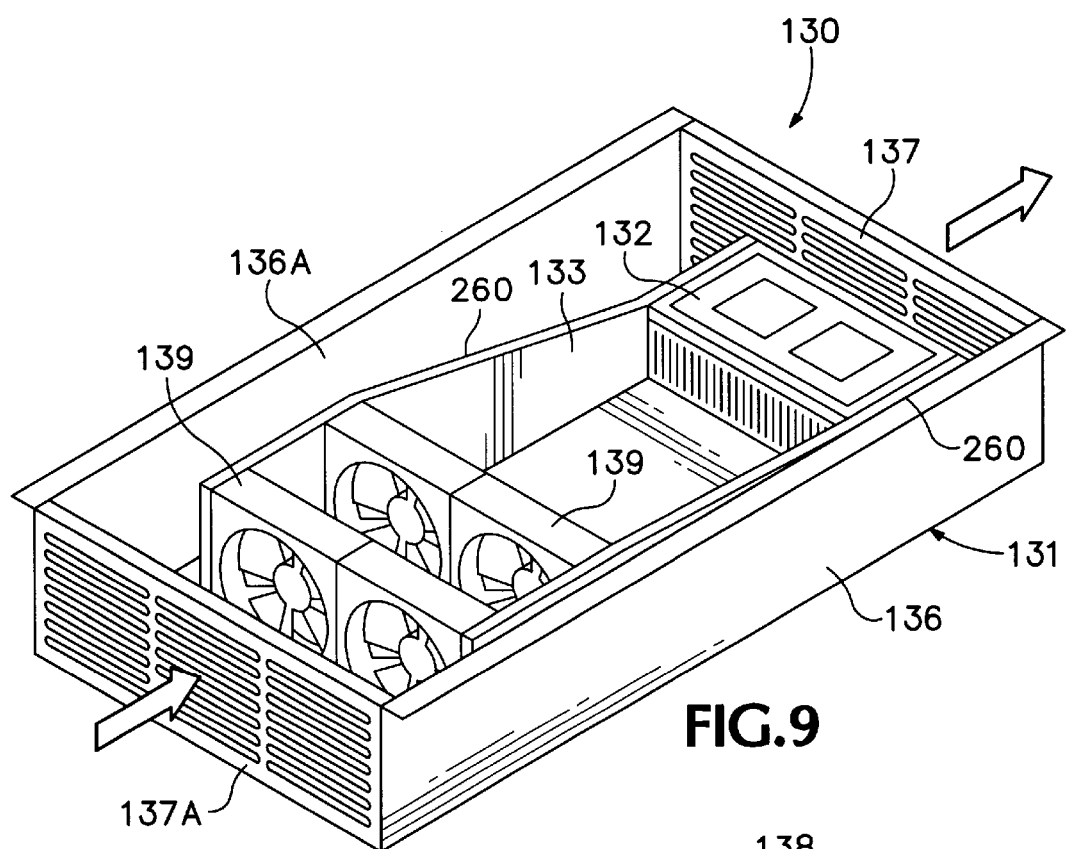
FIG. 9 is a somewhat schematic perspective view of a remote cooling partition of the partitioned computer platform of FIG. 5, showing internal components of the remote cooling partition, including a heat sink, ducting, and cooling fans.
Figure 9A:
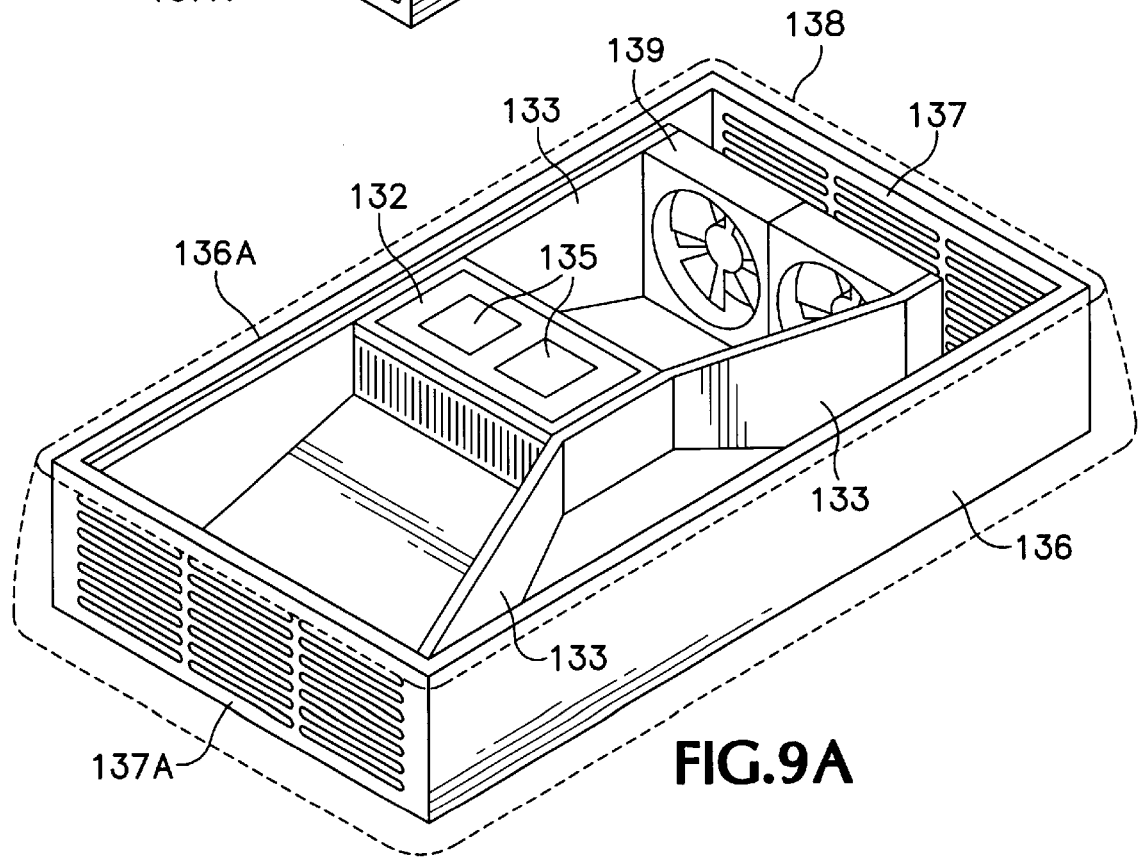
FIG. 9A is a somewhat schematic semi-transparent perspective view of the remote cooling partition of the partitioned computer platform of FIG. 6.

The remote cooling partition 130 will now be described in further detail with respect to FIGS. 9 and 9A. The specific details of the remote cooling interface, however, will be described later with respect to FIGS. 11 and 11A. FIGS. 9 and 9A are somewhat schematic perspective views of a remote cooling partition 130, 130A as used in the first and second embodiments of the invention according to FIGS. 5 and 6, respectively. Referring to FIGS. 9 and 9A, a remote cooling partition 130, 130A includes a cooling system that operates to cool the processor(s) 112 of the core partition 110, 110A. Although the remote cooling partition 130, 130A can be configured to include any type of cooling system capable of providing the necessary cooling for the processor(s) 112, in both of the embodiments described here, the cooling system includes a heatsink 132 and one or more fan assemblies 139.

Referring specifically to FIG. 9, a first embodiment of the remote cooling partition 130 has a housing 131 including lateral side walls 136, 136A, and two longitudinal ends, 137, 137A. A heatsink 132 is positioned within the remote cooling partition 130 so as to be located directly under the processor(s) 112 of the core partition 110, when assembled thereto. Openings are provided in both longitudinal ends 137, 137A of the housing to allow air to flow into and through the housing. Ducting 133 is provided within the housing 131 to direct a flow of air from the fans 139 through fins of the heatsink 132. In this embodiment, two dual parallel fan assemblies 139 are arranged in series to provide air throughput to remove heat from the heatsink 132 and thereby cool the processor(s) 112.

Referring to FIG. 9A, a remote cooling partition 130A according to a second embodiment of this invention similarly includes a housing 131A, lateral side walls 136,136A, and longitudinal ends 137, 137A. A heatsink 132 is also arranged within the housing 131A in an appropriate location so that it can communicate thermally with the processor(s) 112 in the core partition 110 when the remote cooling partition is attached thereto. Openings are provided in both longitudinal ends 137, 137A of the housing to allow air to flow into and through the housing 131A. Ducting 133 is provided within the housing 131A to direct a flow of air from a fan assembly 139A to the heatsink 132. A fan assembly 139 operates to force air through the housing, along the path defined by the ducting 133, from one longitudinal end 137A of the housing to the other 137 through cooling fins of the heatsink 132.

Unlike the first embodiment 130, however, the housing 131A of the second embodiment 130A includes a top wall 138. One or more apertures 135 are provided in the top wall 138 immediately above the heatsink 132. The aperture(s) 135 are configured to mate with apertures of the core partition 110 and form part of a uniquely designed cooling thermal bus, i.e., the remote cooling interface, of this embodiment. The mating apertures 117, 135 of the remote cooling interface allow the processor(s) 112 of the core partition 120A to contact the heatsink 132 of the remote cooling partition 130. The cooling system of this embodiment includes only a single parallel fan assembly 139A.

During operation of both embodiments, the heat sink 132 drains heat from the processor(s) 112 while the fan assembly 139A forces air across fins of the heat sink 132 to cool it. The lateral walls 136, 136A of the remote cooling partition 130, 130A or a separate ducting 133 provided within the partition 130, 130A can be shaped to direct air flow from the fans 139, 139A at a first longitudinal end 137A of the partition 130, 130A through the heat sink 132 and out an opposite end 137 of the partition 130, 130A. In this manner, the remote cooling partition 130, 130A provides an isolated wind tunnel that optimizes a cooling efficiency of the processors by the processor heat sink(s) 132. The optimization of cooling efficiency also allows for quieter operation of the system. As the cooling efficiency increases, the required air throughput is correspondingly reduced and, consequently, the noise of the system. Remote cooling interfaces of this embodiment, for example, have been found to produce noise of only approximately 3.9 bels @ 23° C., well below the "quiet office" acoustic target level of 5.2 bels. To further reduce system noise, sound absorption material 260 may be located along the sides of the remote cooling interface.

Figure 10:
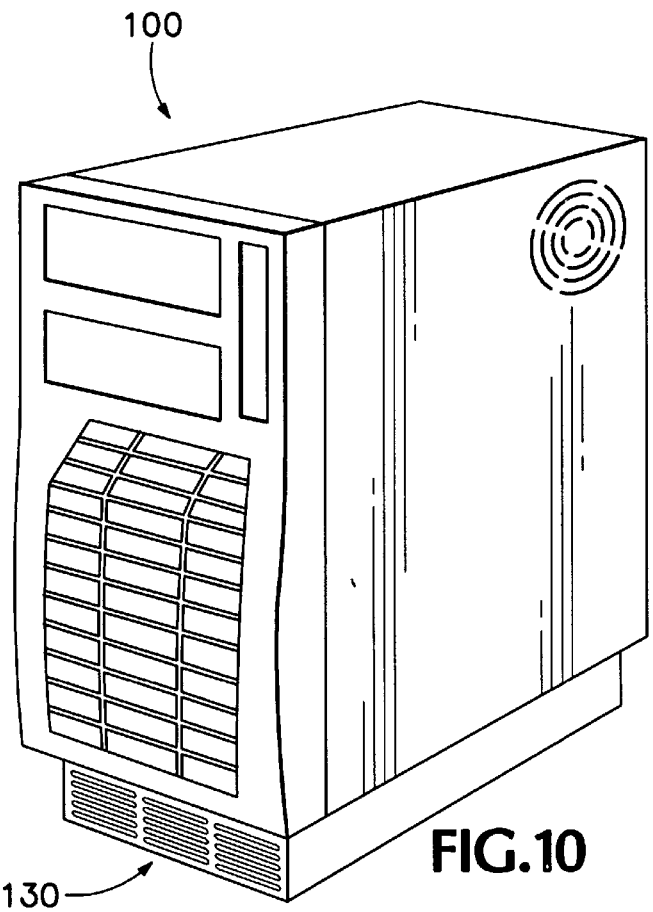
FIGS. 10, and 10A–10C are a somewhat schematic perspective view of the partitioned computer platform of FIG. 5, and somewhat schematic perspective views showing various remote cooling partition embodiments including a uni-processor heatsink embodiment, a liquid cooling or refrigeration embodiment, and a future technology embodiment, respectively.
Figure 10A:
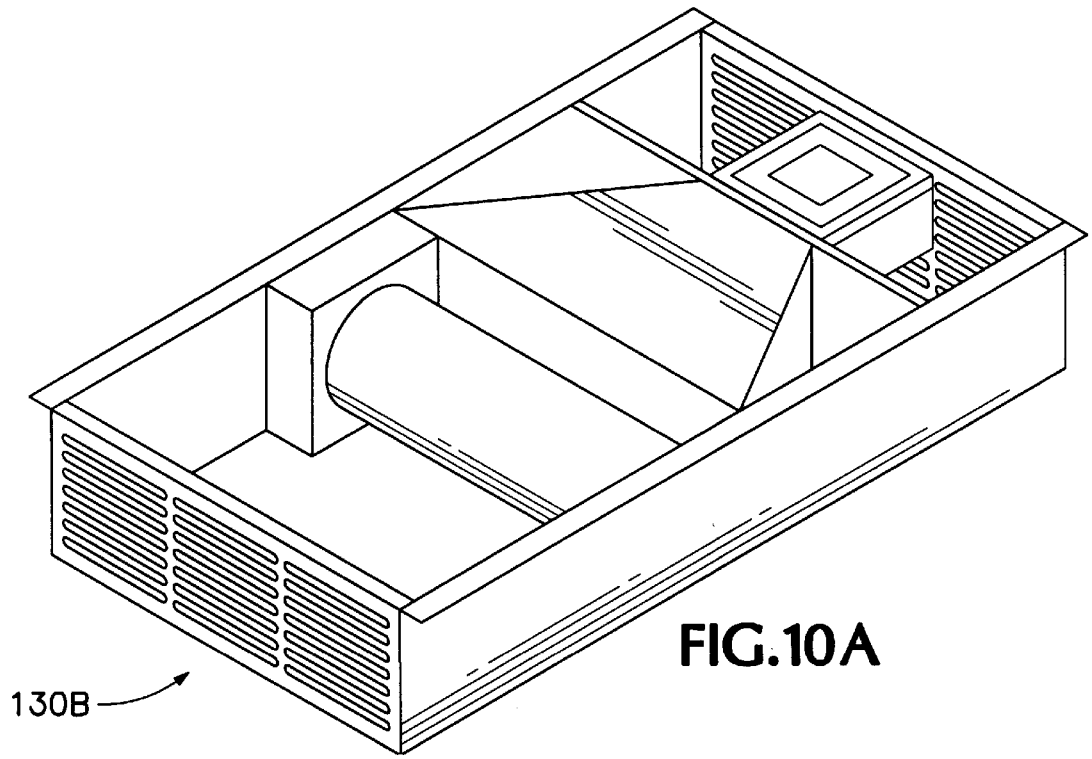
Figure 10B:
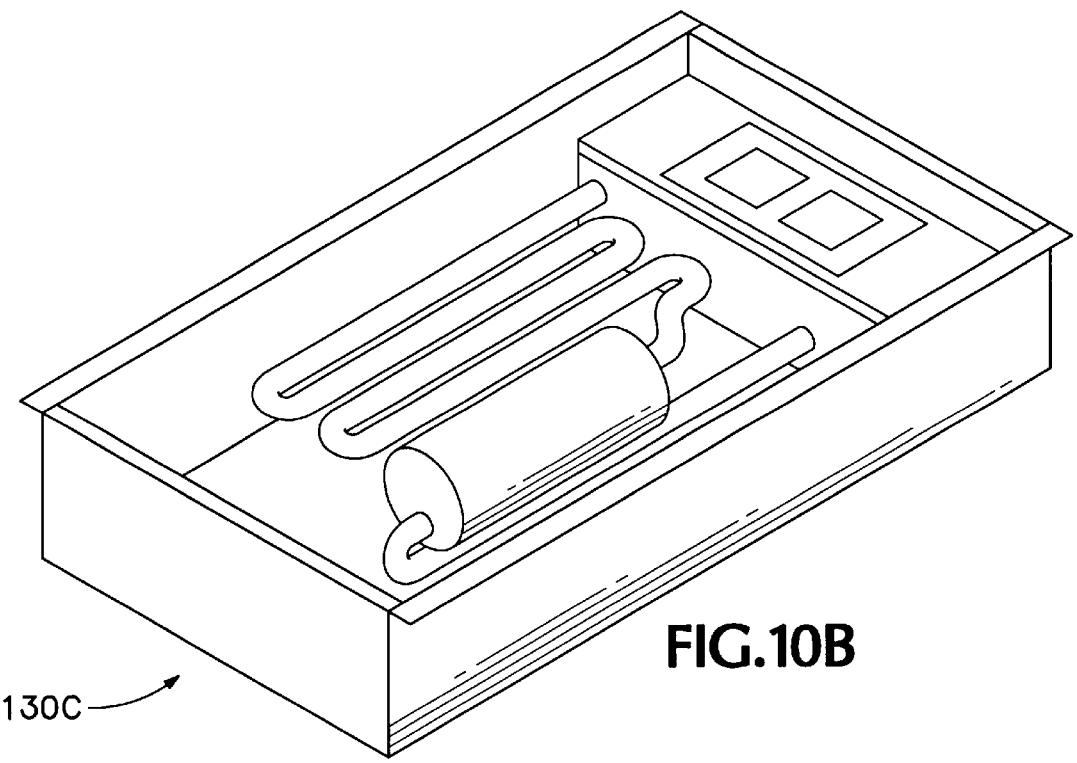
Figure 10C:
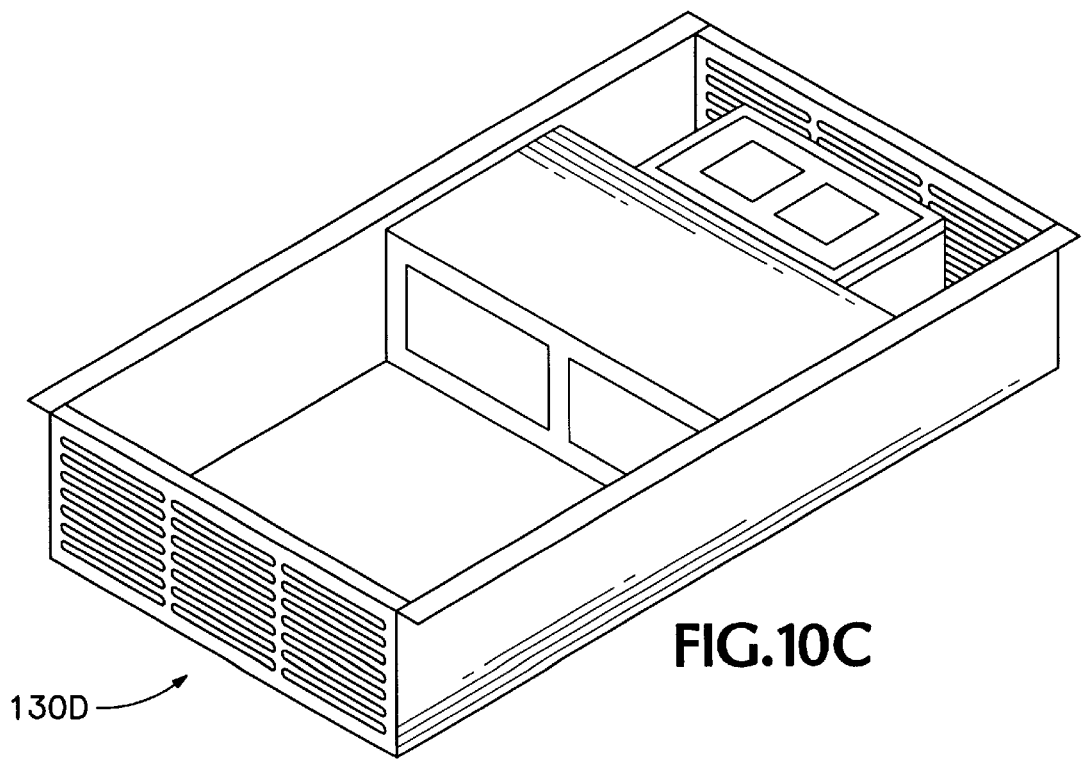

FIGS. 10, and 10A–C are schematic illustrations showing perspective views of the computer platform 100 of FIG. 5 and three further possible embodiments of a remote cooling partition 130B, 130C, 130D for use therewith. Referring to FIGS. 10A–C, other possible remote cooling partition embodiments include a third remote cooling partition embodiment 130B having a single processor cooling system, a fourth remote cooling partition embodiment 130C having a liquid cooling and refrigeration system, and a fifth remote cooling partition embodiment 130C representing the ability to incorporate future technology into the remote cooling partition.

As illustrated, the remote cooling partition is a flexible and scalable thermal solution that can be readily adapted to meet the needs of any particular platform. For example, not only can the type of cooling system used be selected based on the needs of the platform, but the size of the partition and the size of the cooling components can also be modified in accordance with platform requirements. The remote cooling partition can be made larger and use less expensive components than an internal cooling system. It should also be noted that similar remote cooling partitions could be used to cool other parts of a computer platform, such as the graphic processors or primary chipset, for example. Furthermore, it should be apparent that the remote cooling partition(s) need not be located at the base of the computer platform.

Figure 11:
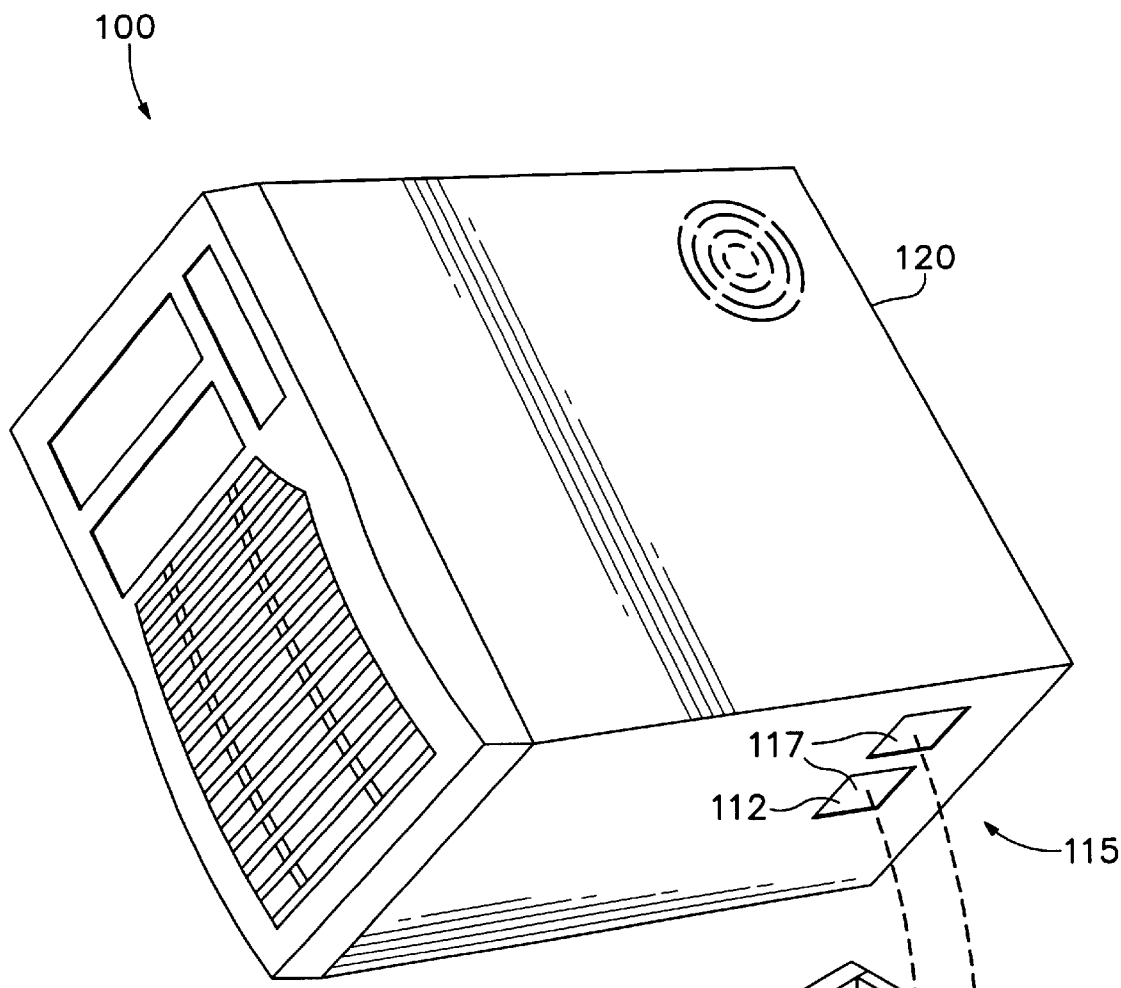
FIG. 11 is a somewhat schematic perspective view of the partitioned computer platform of FIG. 5, showing the remote cooling partition removed from the platform housing to permit viewing of a remote cooling interface between the remote cooling and the core partitions.
Figure 11:
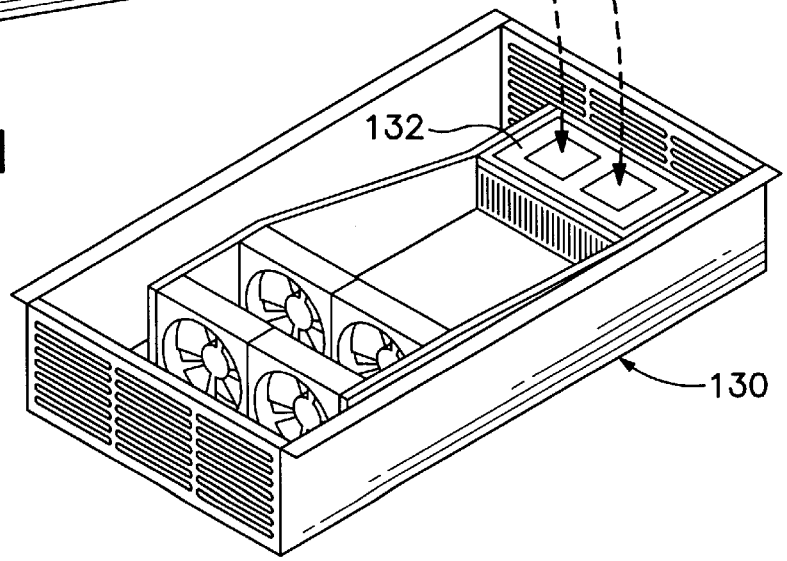
Figure 11A:
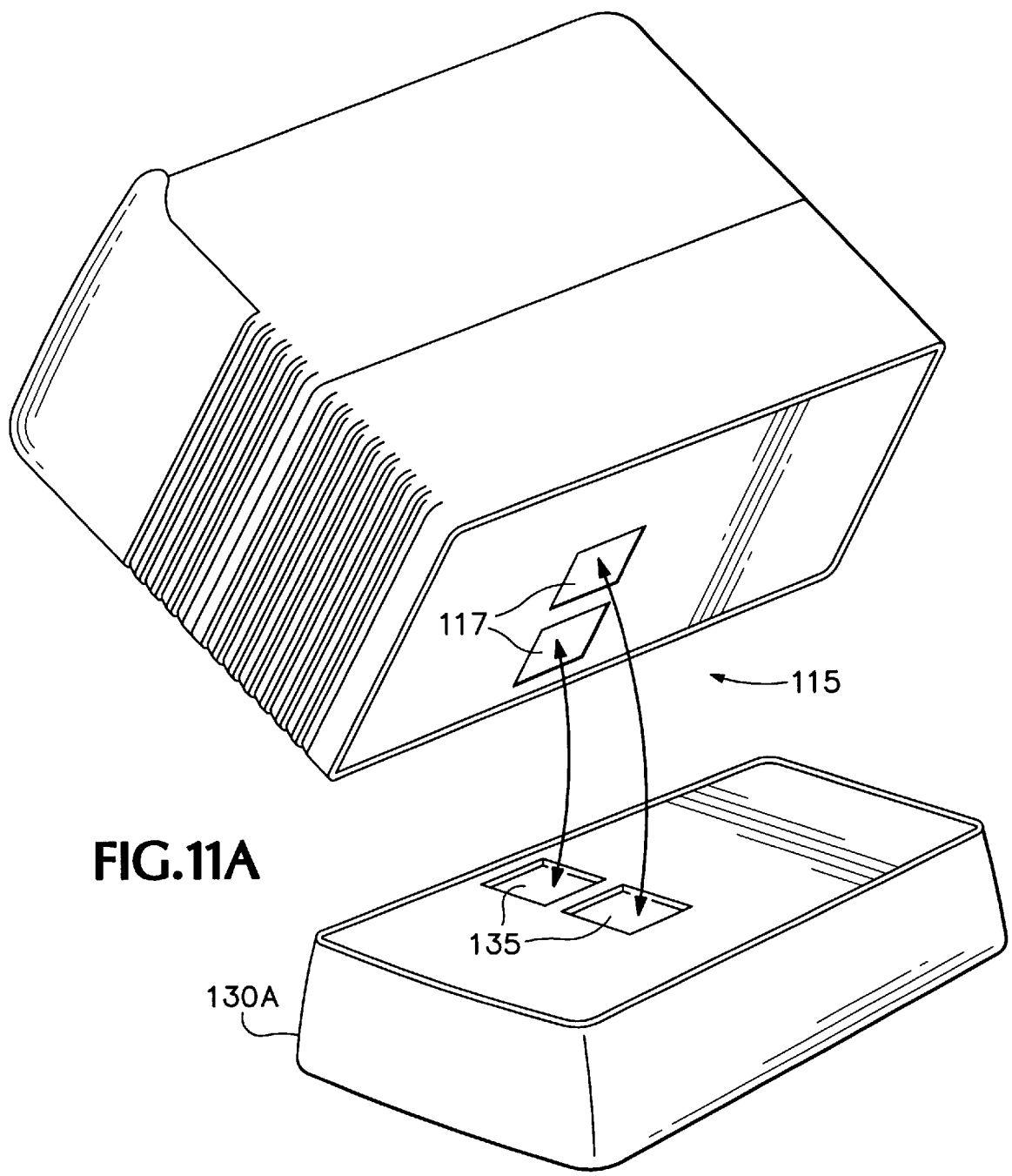
FIG. 11A is a somewhat schematic perspective view of the partitioned computer platform of FIG. 6, showing the core and non-core partitions removed from the remote cooling partition to permit viewing of a remote cooling interface between the remote cooling and the core partitions.

FIG. 11 is a perspective view of the partitioned computer platform 100 of FIG. 5, showing the main housing unit 102 removed from the remote cooling partition 130, to permit viewing of a remote cooling interface 115 between the remote cooling partition 130 and the core partition 110. FIG. 11A is a similar schematic illustration showing the core 110A and non-core partitions 120A, of the second embodiment of the partitioned computer platform 100A of FIG. 6, removed from the remote cooling partition 130A, to permit viewing of a remote cooling interface.

Referring to FIGS. 9, 9A, 11, and 11A, the remote cooling interface 115 allows temperature exchange between the processor(s) 112 in the core partition 110, 110A and the cooling system in the remote cooling partition 130, 130A. In the dual processor arrangement of these embodiments, the remote cooling interface 115 includes two apertures 117, which are formed through the base of the core partition 110, 110A. These apertures 117 allow the processors 112 in the core partition 110, 110A to extend through the housing 102, 102A and contact the heatsink 132 in the remote cooling partition 130, 130A. This configuration allows the heatsink 132 to draw heat away from the processors 112 during operation.

Referring specifically to FIG. 11A, the remote cooling interface 115 according to the second embodiment of the partitioned computer platform 100A of FIG. 6, further includes dual mating apertures 135 defined in the top wall 138 of the remote cooling partition 130A, in addition to the apertures 117 defined in the base 111 of the core partition 110A. In this embodiment, therefore, the processors 112 in the core partition 110A are arranged in thermal communication with the heat sink 132 of the remote cooling partition 130A, through the first apertures 117 and the mating apertures 135. A biasing force, such as a spring loading, can be provided to maintain a good thermal bond line between the processors 112 and the heatsink 132.

To facilitate parallel development of the core partition 110, 110A and the remote cooling partition 130, 130A, the configuration and location of the cooling interface 115 (such as the size and location of the apertures 117, 135) can be standardized. Standardization of the remote cooling interface 115 allows independent development or selection of any type of cooling system for the remote cooling partition 130, 130A while ensuring that it will be able to properly interface with the core partition 110, 110A.

The "divide and conquer" approach of this invention to thermal control of the computer platform has several major benefits. As one of those benefits, the operating requirements for a variety of thermally isolated partitions can be specified such that fewer components with more similar cooling requirements can be located within a single partition. The cooling requirements of each partition can therefore be more easily ascertained with a greater degree of precision and a thermal solution can be provided that independently controls the thermal characteristics, including a temperature gradient, of that partition. Also, independent development of each of the partitions is facilitated because the partitions provide independent building blocks for the system. Furthermore, isolated thermal environments provide much more efficient cooling than the prior art and consequently reduce the air throughput required for cooling. This, in turn, reduces the noise output of the system and enables the platform to more easily meet "quiet office" requirements. Additional benefits include, among many others, reduction in the overall size of the system, reduction in cabling complexity, and reduction in electromagnetic interference.

Simplified Processor Arrangement and Thermal Interface

As described previously with reference to FIGS. 3–4A, the processor arrangement 30 of the prior art is fairly bulky and complex. Specifically, the prior art processor arrangement 30 uses a board-mounted retention scheme to hold each of the processors 58, 58A, their heatsinks 70, 70A, corresponding power pods 72, 72A, and their heatsinks 74, 74A in position within the computer platform 20. Furthermore, the prior art processor arrangement 30 occupies a large footprint 32 on the CPU board 55, i.e., about 75 square inches, as well as a significant volume of space within the platform 20, i.e., approximately 122 cubic inches. Consequently, this arrangement is not volumetrically or board space conservative.

Board mounting also creates other significant problems. For example, board mounting results in tolerance stack-up because the components are mounted directly on top of each other. Also, because the heatsinks for both the processors 58, 58A and the power pods 72, 72A are fairly heavy, shock or vibration of the computer platform 20 can seriously damage the CPU board 55 and/or board-mounted components. The allowable size and mass of the heatsinks 70, 70A, 74, 74A are consequently limited due to board-mounting considerations, such as the strength of the board, locations of board supports, shock/vibration concerns, etc.

Figure 12:
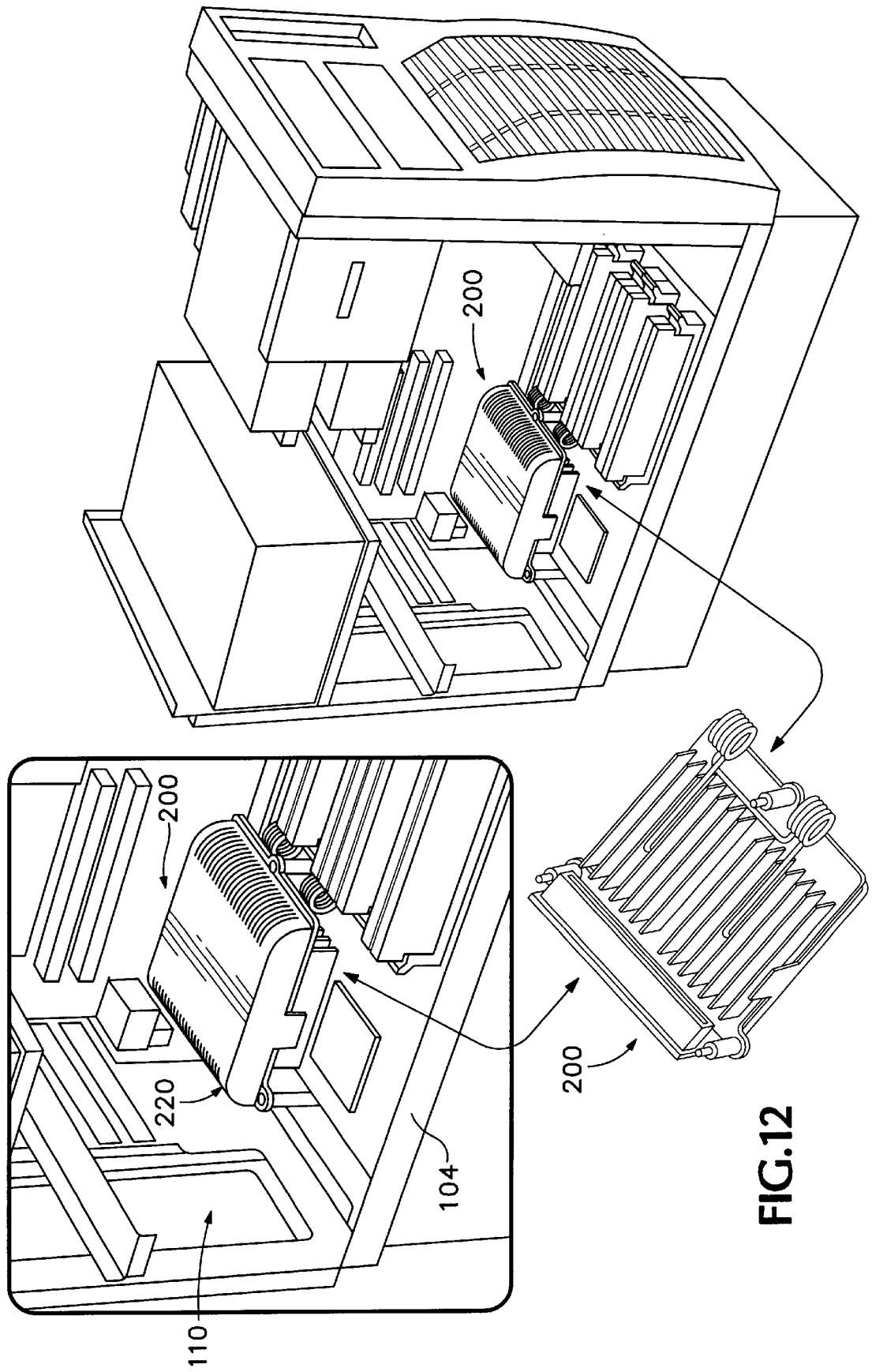
FIG. 12 is a somewhat schematic enlarged perspective view of the internal configuration of a portion of the computer platform of FIG. 5, showing a simplified processor arrangement for providing a thermal interface between one or more processors in the core partition and a heatsink in the remote cooling partition, according to a third embodiment of this invention.
Figure 13:
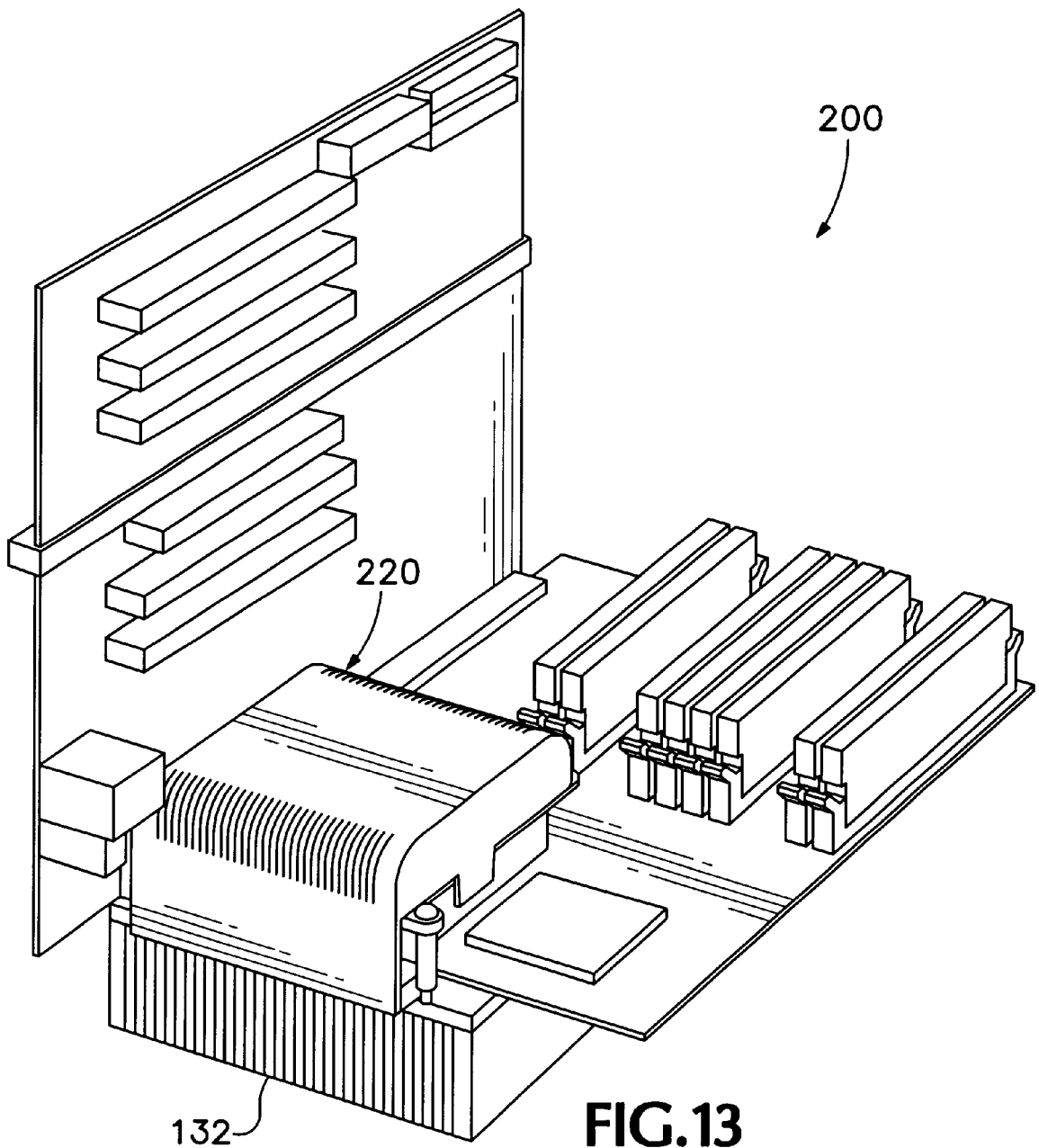
FIG. 13 is a somewhat schematic perspective view of the simplified processor arrangement of FIG. 12, showing the components assembled together in their operating relationship.
Figure 13A:
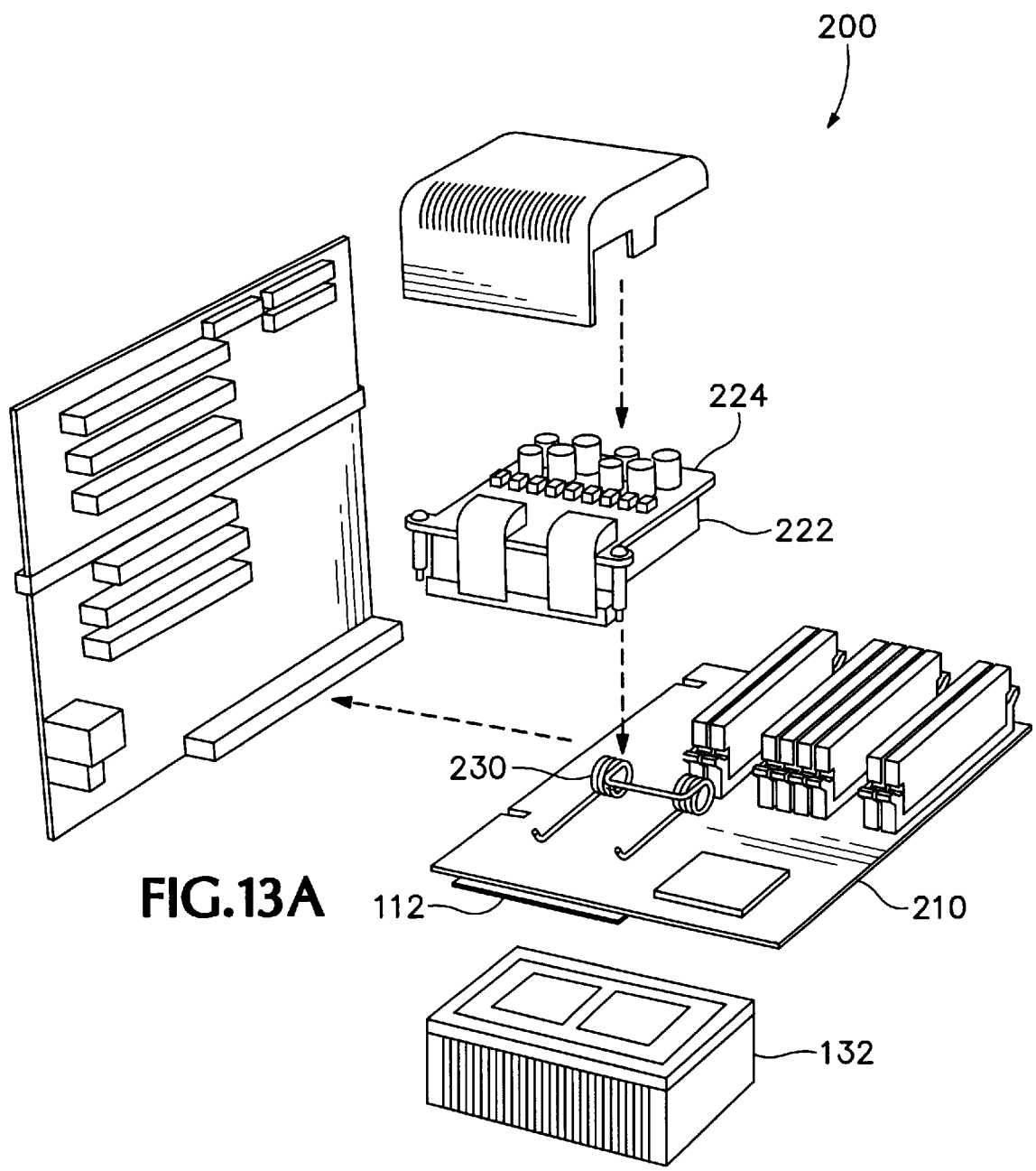
FIG. 13A is a somewhat schematic exploded perspective view of the simplified processor arrangement of FIG. 13, showing the relationship between its components.
Figure 14:
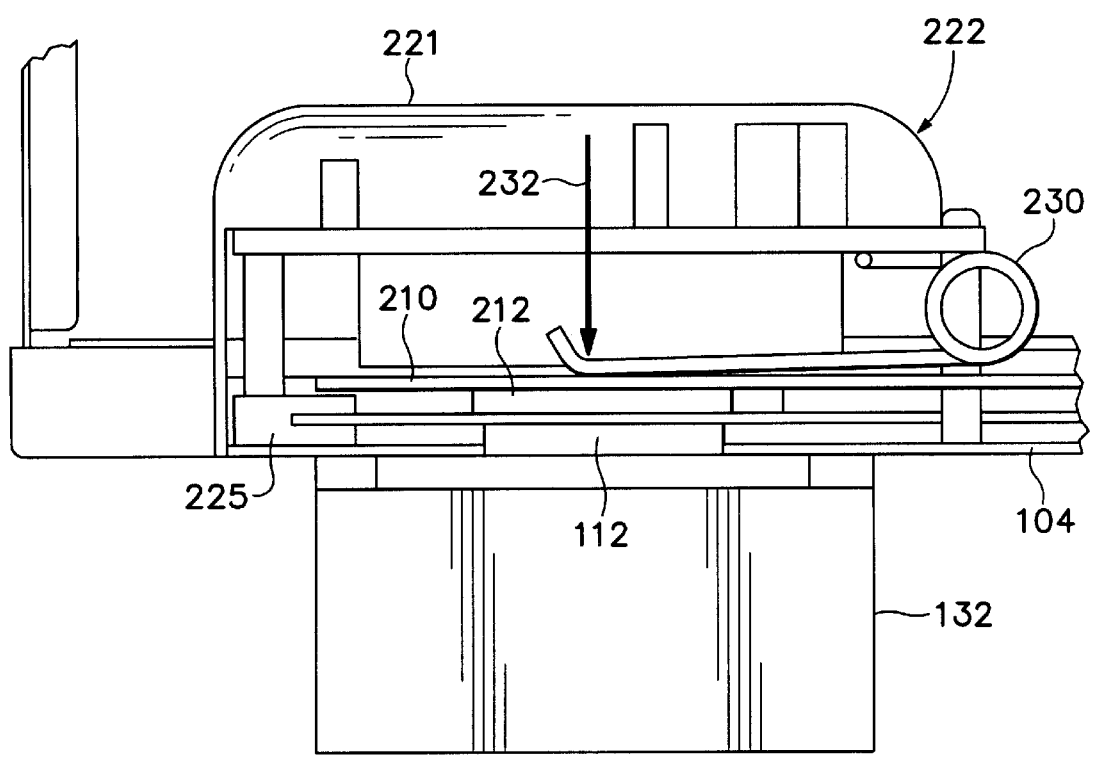
FIG. 14 is a somewhat schematic side view of the processor arrangement of FIG. 13.
Figure 15:
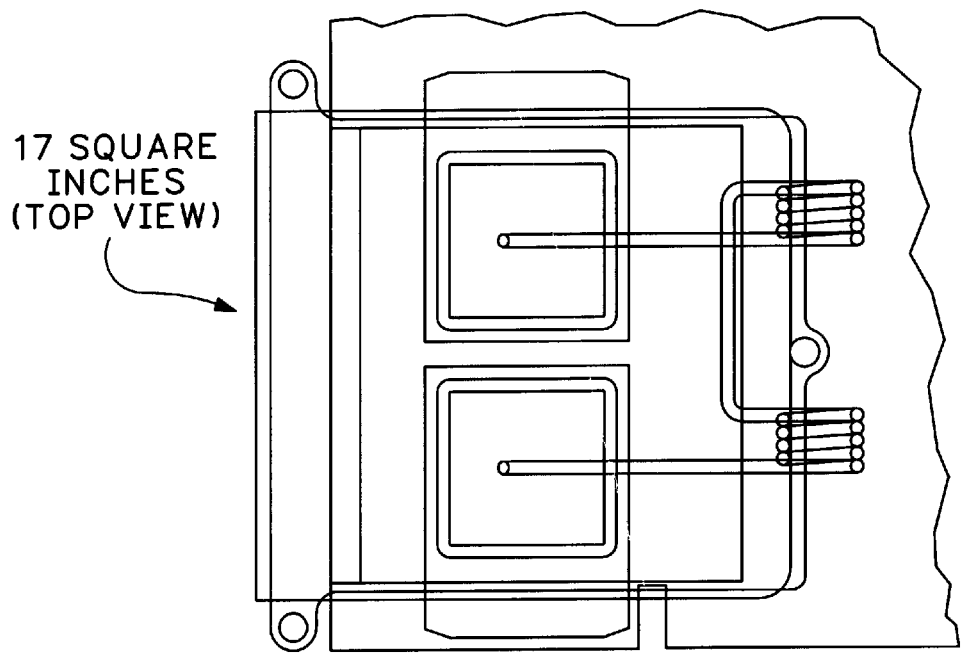
FIG. 15 is a somewhat schematic semi-transparent top plan view of the processor arrangement of FIG. 13, showing a reduced footprint as compared to the prior art processor arrangement of FIG. 4.
Figure 15A:
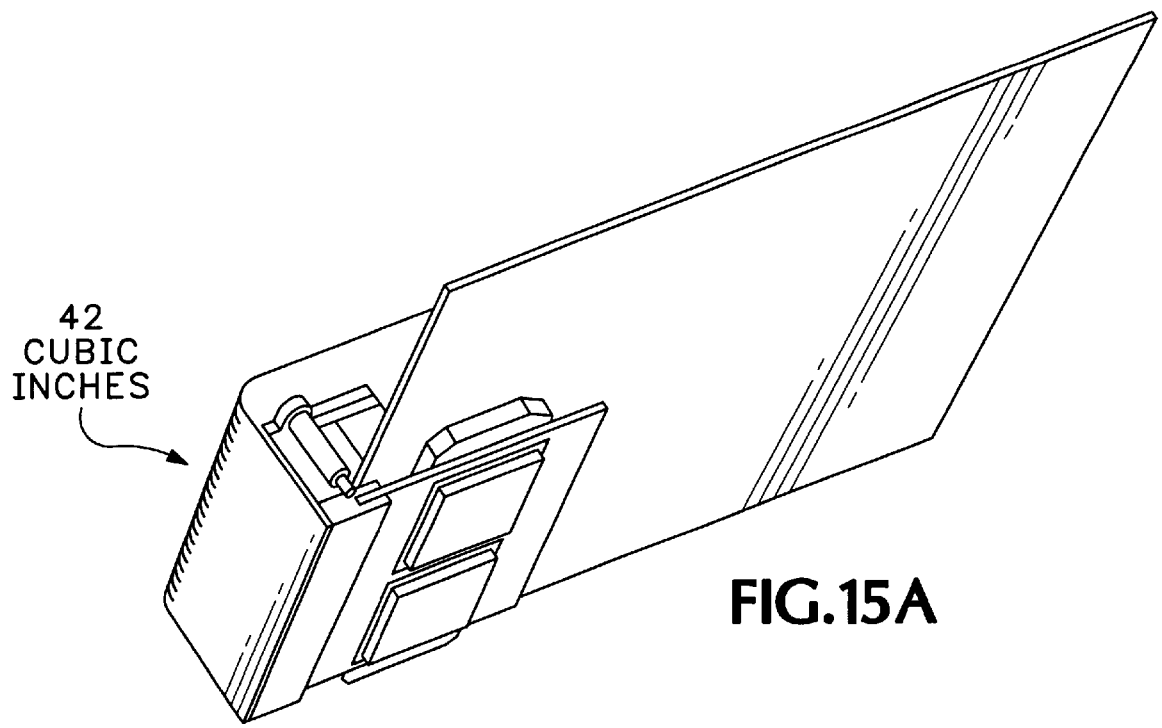
FIG. 15A is a somewhat schematic perspective view of the processor arrangement of FIG. 13, illustrating a reduced volumetric space occupied by this arrangement as compared to the prior art processor arrangement shown in FIG. 4A.
Figure 16:
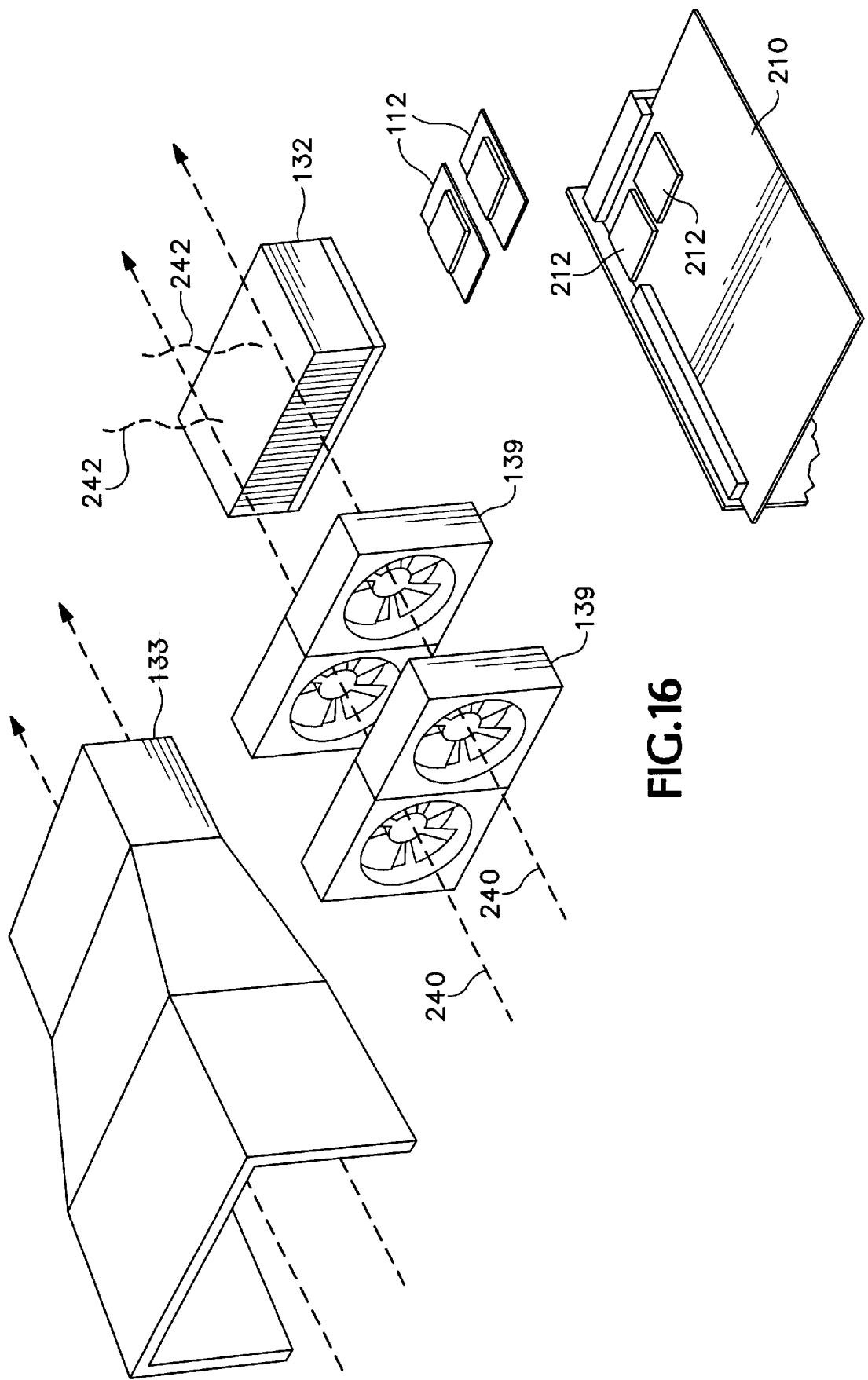
FIG. 16 is a somewhat schematic exploded bottom perspective view of the processor arrangement of FIG. 13 and components of the remote cooling partition of FIG. 9.

A processor arrangement 200, according to yet another embodiment of this invention, offers a solution to these problems and will now be described with reference to FIGS. 12–16. FIG. 12 is a somewhat schematic enlarged perspective view of the partitioned computer platform 100 of FIG. 5, shown having a portion of its outside housing 102 and the internal divider 106 removed to permit viewing of the processor arrangement 200 according to this embodiment. FIG. 13 is a somewhat schematic perspective view of the improved processor arrangement 200 shown removed from the computer platform 100. FIG. 13A is a somewhat schematic exploded perspective view of the processor arrangement 200 of FIG. 13, showing a relationship between its components. FIG. 14 is schematic side elevation view of the processor arrangement 200 of FIG. 13. FIG. 15 is a somewhat schematic semi-transparent top plan view of the improved processor arrangement 200 of FIG. 13. FIG. 15A is a somewhat schematic perspective view of the processor arrangement 200, indicating its approximate volumetric size. Finally, FIG. 16 is a somewhat schematic exploded bottom perspective view showing an interface between the processor arrangement 200 and the heatsink 132 of the remote cooling partition 120.

The simplified processor arrangement 200 of this embodiment solves many of the problems experienced in the prior art. Referring to FIG. 12, the simplified processor arrangement 200 is preferably located at the base 111 of the core partition 110 of the computer platform of FIG. 5. Unlike the prior art processor arrangement described previously, the power pod assembly 220 of this arrangement mounts directly to the chassis 104 at the base 111 of the computer platform housing 102, rather than to the CPU board 210. Additionally, the heatsink 132 of the remote cooling partition 130 is mounted within the remote cooling partition 130, rather than to the CPU board 210. Because neither the power pod, its heatsink, or the processor heatsink are board-mounted, the concerns described previously related to board-mounting are avoided by this embodiment.

Referring to FIGS. 13 and 13A, the simplified processor arrangement 200 also provides a thermal interface between the processor(s) 112 in the core partition 110 and the heatsink 132 in the remote cooling partition 130 (see FIG. 5). The processor(s) (two processors in this embodiment) 112 are located within CPU socket(s) 212 on the underside of the CPU board 210. The power pod assembly 220, including a power pod board 224, and a power pod heatsink 222, is disposed above the CPU board 210 and is secured to the chassis 104 of the computer platform 100. A load spring 230 is disposed between the power pod heatsink 222 and the CPU board 210 and is configured to supply a constant biasing force against the upper surface of the CPU board 210. This biasing force is transferred through the flexible CPU board 210 to the processor 112, thereby biasing the processor(s) 112 in a secure thermal relationship with the heatsink 132. Support of the CPU board by the platform housing 102 is preferably provided away from the load spring 230, to provide natural plastic cool flow deflection of the CPU board and to thereby allow a good thermal bond line at the interface between the processor(s) 112 and the heatsink 132.

Referring now to FIG. 14, force arrow 232 represents the biasing force supplied by the load spring 230 against the CPU board 210. As indicated by arrow 232, the load spring 230 supplies a constant biasing force down through the flexible CPU board 210 against the processor(s) 112 to bias them in a good thermal relationship with the heatsink 132. The power pod heatsink 222, which is secured to the platform chassis 104 via the power pod connector 225, provides the structural mounting for the load spring 230 to enable the provision of the biasing force 232.

FIGS. 15 and 15A illustrate the CPU board footprint and volumetric size of the simplified processor arrangement 200 of FIG. 13. As evident from a comparison of FIGS. 15 and 15A with FIGS. 4 and 4A, the processor arrangement 200 according to this embodiment of the invention offers a greatly reduced board footprint and volumetric size. Specifically, the footprint occupied by the improved processor arrangement 200 on the CPU board 210 is only around 17 square inches as compared to the approximately 75 square-inch footprint of the prior art. This represents about a 77.3% reduction in footprint area. Furthermore, the volume occupied within the core partition 110 by the improved processor arrangement 200 of this embodiment is only around 42 cubic inches, compared with the approximately 122 cubic inches of the prior art processor arrangement, thereby resulting in a volumetric savings of about 66.7%. This embodiment, therefore, offers a more ideally space conservative processor arrangement than that of the prior art. This space conservation can be translated into smaller platform sizes with the same, or even increased, processing ability.

FIG. 16 is a somewhat schematic exploded bottom perspective view of the improved processor arrangement 200 further showing internal components of the remote cooling partition 130. Referring to FIG. 16, the heatsink 132 of the remote cooling partition 130 is positioned in thermal communication with the processor(s) 112, which are mounted in the CPU sockets 212 on the bottom side of the CPU board 210. As noted previously, the heatsink 132 operates to draw heat away from the processor(s) 112. The heatsink 132 is, in turn cooled, by the natural convection of the heatsink 132 (represented by dashed lines 242), as well as by an airflow (represented by arrows 240) provided from cooling fans 139, which passes through the fins of the heatsink 132. Tight fitting ducting 133 is also preferably provided to direct the entire volume of airflow 240 from the fans 139 to the heatsink 132. In this manner, the cooling arrangement described above provides an isolated wind tunnel that provides efficient cooling of the processor(s) 112. In addition to providing benefits in reduced energy consumption in cooling, this efficient cooling system reduces the required amount of airflow 240 that needs to be output from the fans 139 and therefore allows for quieter system operation.

Computer platform partitioning as described above offers several advantages. Parallel development of a computer platform, for instance, is possible. The computer platform design is divided into discreet partitions. These partitions have known operating requirements, including, for example, the functional operations required to be carried out by the partition and what its inputs and outputs should be. The physical arrangement, type of interconnections (both physical and electrical), size, and external design of the partitions can also be established, if desired to enable co-development between customers, vendors, and internal groups.

A temperature control solution can then be provided for one of the partitions that is independent of a temperature control solution for any other partition. Design parameters can also be established to allow development of a remote cooling partition to control a temperature of a processor in a core partition.

Another benefit of this invention is the creation of controllable thermal environments within the computer platform. A first group of electronic computer components is assembled into a first isolated thermal environment of a computer platform. The first isolated thermal environment has a first temperature to be controlled. A second group of computer components is assembled into a second isolated thermal environment of the computer platform. The second isolated thermal environment has a second temperature to be controlled. A thermal solution can then be provided that controls the first temperature substantially independent of a thermal solution provided for controlling the second temperature. A third thermal environment in thermal communication with a microprocessor to control a temperature of the microprocessor.

The ability to construct or upgrade a partitioned computer platform is also advantageous. Constructing or upgrading a partitioned computer platform includes supplying one or more of the partitions for the computer platform. Each partition is configured to electrically or physically communicate with one or more other partitions. In the modular partition embodiment, entire partitions may be snapped off and replaced with replacement modules. This simplified ability to upgrade their computer platform has the potential to save users time and money by allowing them to upgrade their own systems quickly and easily.

Having described and illustrated the principles of the invention in several embodiments thereof, it should be apparent that the invention can be modified in arrangement and detail without departing from such principles. We claim all modifications and variations coming within the spirit and scope of the following claims.

What is claimed is:

1. A processor arrangement for a computer platform comprising:

a CPU board;

a processor mounted on the CPU board;

a power pod assembly; and a biasing mechanism for supplying a biasing force against the processor to maintain it in thermal communication with a cooling device.

2. A processor arrangement according to claim 1, wherein the power pod assembly comprises a power pod and a power pod heatsink, and wherein said biasing mechanism is mounted between the power pod heatsink and the CPU board.

3. A processor arrangement according to claim 1, wherein the power pod assembly is mounted to a frame of the computer platform.

4. A processor arrangement according to claim 1, wherein the biasing mechanism is a load spring.

5. A processor arrangement according to claim 1, wherein the biasing mechanism is a load spring arranged between the power pod assembly and the CPU board and is configured to supply a biasing force against the CPU board on a first side of the CPU board, wherein the processor is located on a second, opposite side of the CPU board, and wherein the biasing force maintains the processor in thermal communication with the cooling device.

6. A processor arrangement according to claim 1, wherein the cooling device is a heatsink located on an opposite side of a platform housing from the CPU board.

7. A processor arrangement according to claim 6, wherein the processor is configured to communicate with the heatsink through an aperture in the platform housing.

8. A computer platform comprising:

a platform housing;

a CPU board arranged on a first side of the platform housing;

a processor mounted on the CPU board; and a biasing mechanism for supplying a biasing force against the processor to maintain it in thermal communication with a cooling device, wherein the cooling device is arranged on an opposite side of the platform housing, and wherein the processor is biased in thermal communication with the cooling device through an aperture in the platform housing.

9. A computer platform according to claim 8, wherein the biasing mechanism is a load spring mounted between a power pod assembly and the CPU board, and wherein a CPU board support is located away from the load spring.

10. A computer platform comprising:

a housing;

a CPU board located within the housing;

a power pod assembly located adjacent a first side of the CPU board;

a CPU socket located on a second side of the CPU board, said second side of the CPU board located opposite the first side of the CPU board;

a processor mounted within the CPU socket, said processor arranged in electrical communication with the power pod; and a cooling device located adjacent the processor on the second side of the CPU board, said cooling device configured to cool the processor.

11. A computer platform according to claim 10, further comprising a biasing mechanism for maintaining the processor in thermal communication with the cooling device.

12. A computer platform according to claim 10, wherein the power pod assembly comprises a power pod board, a power pod cover, and a power pod heatsink and wherein the biasing mechanism is mounted between the power pod heatsink and the CPU board and is configured to supply a biasing force against the CPU board to maintain the processor in thermal communication with the cooling device.

13. A computer platform according to claim 10, wherein the biasing mechanism is a load spring.

14. A computer platform according to claim 10, wherein the power pod assembly is attached to the platform housing.

15. A processor arrangement, comprising:

a CPU board having a first side and a second side located opposite the first side;

a CPU socket located on the second side of the CPU board;

a processor mounted within the CPU socket;

a power pod assembly located adjacent the first side of the CPU board;

a cooling device located adjacent the second side of the CPU board; and a biasing mechanism located between the power pod assembly and the CPU board and configured to supply a biasing force against the first side of the CPU board adjacent the location of the CPU socket on the second side of the CPU board to bias the processor in thermal communication with the cooling device.

16. A processor arrangement according to claim 15, wherein the biasing mechanism is a load spring.

17. A processor arrangement according to claim 15, wherein the power pod assembly includes a power pod heatsink and wherein the power pod heatsink is located adjacent the CPU board and wherein the biasing mechanism is mounted between the power pod heatsink and the CPU board.

18. A processor arrangement according to claim 15, further comprising:

a first and a second CPU socket each located on the second side of the CPU board; and a first processor and a second processor located within the first and second CPU sockets, respectively, said biasing mechanism maintaining said first and second processor in thermal communication with the cooling device when said arrangement is in operative condition.

19. A processor arrangement according to claim 15, wherein a CPU board support is located away from the biasing mechanism to assure a good thermal bond line at an interface between the processor and the cooling device.

20. A processor arrangement according to claim 15, wherein the power pod assembly is mounted to a housing of the computer platform.

* * * * *

UNITED STATES PATENT AND TRADEMARK OFFICE
CERTIFICATE OF CORRECTION

PATENT NO. : 6,437,979 B1  Page 1 of 1
DATED : August 20, 2002
INVENTOR(S) : Unrein It is certified that error appears in the above-identified patent and that said Letters Patent is hereby corrected as shown below:

Column 1,
Line 44, "close proximity properly" should read -- close proximity. Properly --.

Column 7,
Line 10, "partition 110A non-core" should read -- partition 110A, a non-core --.

Column 8,
Line 14, "the non-core. partition 120" should read -- the non-core partition 120 --.
Line 16, "the peripheral Component" should read -- the Peripheral Component --.

Column 10,
Line 23, "FIGS. 10A - C" should read -- FIGS. 10A - 10C --.

Column 12,
Lines 52 and 65, "through the flexible CPU board 210" should read
-- through the CPU board 210 --.

Signed and Sealed this

Thirteenth Day of January, 2004

JON W. DUDAS
*Acting Director of the United States Patent and Trademark Office*